(12) United States Patent
Urdaneta

(10) Patent No.: US 10,815,752 B2
(45) Date of Patent: Oct. 27, 2020

(54) AUTOMATED PUMP CONTROL OF A CEMENTING UNIT OF WELLSITE EQUIPMENT

(71) Applicant: SCHLUMBERGER TECHNOLOGY CORPORATION, Sugar Land, TX (US)

(72) Inventor: Carlos Urdaneta, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 166 days.

(21) Appl. No.: 15/563,670

(22) PCT Filed: Mar. 24, 2016

(86) PCT No.: PCT/US2016/023856
§ 371 (c)(1),
(2) Date: Oct. 2, 2017

(87) PCT Pub. No.: WO2016/160458
PCT Pub. Date: Oct. 6, 2016

(65) Prior Publication Data
US 2018/0073346 A1 Mar. 15, 2018

Related U.S. Application Data

(60) Provisional application No. 62/139,963, filed on Mar. 30, 2015.

(51) Int. Cl.
*E21B 33/14* (2006.01)
*G05B 19/02* (2006.01)
(Continued)

(52) U.S. Cl.
CPC ........ *E21B 33/14* (2013.01); *B01F 15/00136* (2013.01); *E21B 33/13* (2013.01);
(Continued)

(58) Field of Classification Search
CPC ...... E21B 33/14; E21B 33/13; E21B 47/0005; G05B 19/02; G05B 19/409; B01F 15/00136; B01F 15/0243
See application file for complete search history.

(56) References Cited

U.S. PATENT DOCUMENTS 3,705,626 A    12/1972   Glenn, Jr.
5,006,044 A *   4/1991   Walker, Sr. ......... E21B 47/0008
                                                                417/12

(Continued)

FOREIGN PATENT DOCUMENTS

WO          9708459 A1    3/1997
WO   WO-9708459 A1 *   3/1997   ........... E21B 43/121

OTHER PUBLICATIONS

International Search Report and Written Opinion issued in International Patent Appl. No. PCT/US2016/023856 dated Jun. 27, 2016; 21 pages.

(Continued)

*Primary Examiner* — Charles Cooley
(74) *Attorney, Agent, or Firm* — Rodney Warfford

(57) ABSTRACT

Systems and methods for controlling wellsite equipment, including a cementing unit comprising a plurality of sensors operable to generate information related to operational status of the cementing unit and a controller comprising a processor and a memory including computer program code. Communication is established between the cementing unit and the controller. The controller is operable to operate the controller to automatically perform initialization of operation of the cementing unit, operate the controller to automatically perform a flow rate calibration of the cementing unit, and/or operate the controller to automatically perform a cement pumping operation of the cementing unit.

6 Claims, 8 Drawing Sheets

(51) Int. Cl.
*E21B 33/13* (2006.01)
*E21B 47/005* (2012.01)
*B01F 15/00* (2006.01)
*G05B 19/409* (2006.01)

(52) U.S. Cl.
CPC ............ *E21B 47/005* (2020.05); *G05B 19/02* (2013.01); *G05B 19/409* (2013.01)

(56) References Cited

U.S. PATENT DOCUMENTS

| | | | | |
|---|---|---|---|---|
| 5,289,877 | A * | 3/1994 | Naegele | ............ E21B 33/13 166/285 |
| 2003/0196798 | A1 | 10/2003 | Newman | |
| 2004/0120804 | A1 * | 6/2004 | Sabini | ............ F04D 15/0088 415/118 |
| 2009/0068031 | A1 | 3/2009 | Gambier et al. | |
| 2011/0046903 | A1 | 2/2011 | Franklin | |
| 2012/0301320 | A1 | 11/2012 | Seitter | |
| 2013/0233165 | A1 * | 9/2013 | Matzner | ............ F04B 51/00 91/1 |
| 2013/0290064 | A1 | 10/2013 | Altamirano et al. | |
| 2017/0082101 | A1 * | 3/2017 | Urdaneta | ............ F04B 51/00 |
| 2017/0211569 | A1 * | 7/2017 | Urdaneta | ............ F04B 49/065 |
| 2018/0003171 | A1 * | 1/2018 | Rashid | ............ E21B 43/26 |
| 2018/0073346 | A1 * | 3/2018 | Urdaneta | ............ G05B 19/02 |
| 2018/0258736 | A1 * | 9/2018 | Urdaneta | ............ E21B 33/13 |
| 2020/0206975 | A1 * | 7/2020 | Urdaneta | ............ E21B 33/13 |

OTHER PUBLICATIONS

International Search Report and Written Opinion issued in International Patent Appl. No. PCT/US2016/023857 dated Oct. 7, 2016; 18 pages.

* cited by examiner

US 10,815,752 B2

AUTOMATED PUMP CONTROL OF A CEMENTING UNIT OF WELLSITE EQUIPMENT

CROSS-REFERENCE TO RELATED APPLICATIONS

This application claims priority to and the benefit of U.S. Provisional Application No. 62/139,963, titled "WELL CEMENTING METHODS," filed Mar. 30, 2015, the entire disclosure of which is hereby incorporated herein by reference.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsite operations. In some pumping operations, several pumps may be fluidly connected to a well via various fluid conduits and/or a manifold. During such operations, the fluid conduits and/or the manifold distributes low-pressure fluid from a mixer, a blender, and/or other sources among the pumps and combines pressurized fluid from the pumps for injection into the well. The fluid conduits and/or the manifold may have a large physical size and weight to satisfy intended fluid flow rates and operating pressures generated by the pumps.

Success of the pumping operations at a wellsite may be affected by many factors, including efficiency, failure rates, and safety related to operation of the pumps and the manifold. High fluid pressures, flow rates, and vibrations generated by the pumps may cause mechanical fatigue, wear, and other damage to the pumps and various downstream equipment, including the manifold and associated fluid sensors, valves, couplings, and conduits. Mechanical fatigue and wear may cause leaks and/or other failures in the pumps and the various downstream equipment.

To ensure that the wellsite equipment operates as intended, human operators at the wellsite may perform pressure and flow rate calibrations, diagnostics, and other tests before commencing actual downhole pumping operations. To perform such tests and to oversee the actual downhole pumping operations, the operators typically approach the wellsite equipment to visually inspect the fluid sensors and to manually adjust the fluid valves, thus exposing themselves to a potentially dangerous environment. Approaching wellsite equipment during testing or pumping operations may be dangerous, such as because high-pressure fluid within such equipment may escape, which may lead to serious injuries. Also, performing the testing and pumping operations manually may result in inconsistent equipment settings and, thus, inconsistent performance between different operational stages or jobs caused by human error.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes establishing communication between a cementing unit and a controller operable to control operation of the cementing unit. The controller includes a processor and a memory including computer program code. The method also includes inputting a fluid volume set-point and operating the controller to automatically perform a flow rate calibration of the cementing unit and a cement pumping operation of the cementing unit. The flow rate calibration includes automatically: varying pumping speed of the cementing unit while recording first pumping speeds and corresponding first flow rates generated by the cementing unit; and determining a flow rate ramp relating the recorded first flow rates to the corresponding recorded first pumping speeds. The cement pumping operation includes automatically: (a) increasing pumping speed of the cementing unit while recording: (i) second pumping speeds; (ii) first pressures generated by the cementing unit corresponding to the recorded second pumping speeds; and (iii) second flow rates generated by the cementing unit corresponding to the recorded second pumping speeds and/or first pressures; then (b) maintaining the pumping speed while recording the maintained pumping speed and corresponding second pressures and third flow rates; and then (c) decreasing the pumping speed while recording fourth pumping speeds and corresponding third pressures and fourth flow rates until the cementing unit has stopped pumping cement and a volume of the pumped cement is substantially equal to the fluid volume set-point.

The present disclosure also introduces a method that includes establishing communication between a cementing unit and a controller operable to control operation of the cementing unit. The cementing unit includes sensors operable to generate information related to operational status of the cementing unit, and the controller includes a processor and a memory including computer program code. The method also includes operating the controller to automatically perform initialization of the cementing unit. The initialization includes automatically: determining operational parameters related to the cementing unit operational status based on the information generated by the sensors; and confirming the operational parameters are within corresponding predetermined ranges.

The present disclosure also introduces a method that includes establishing communication between a cementing unit and a controller operable to control operation of the cementing unit. The controller includes a processor and a memory including computer program code. The method also includes operating the controller to automatically perform a flow rate calibration of the cementing unit. The flow rate calibration includes automatically: varying pumping speed of the cementing unit while recording the pumping speed and a corresponding flow rate generated by the cementing unit; and determining a flow rate ramp relating the recorded flow rates to the corresponding recorded pumping speeds.

The present disclosure also introduces a method that includes establishing communication between a cementing unit and a controller operable to control operation of the cementing unit. The controller includes a processor and a memory including computer program code. The method also includes inputting a fluid volume set-point, and operating the controller to automatically perform a cement pumping operation of the cementing unit. The cement pumping operation includes automatically: (1) increasing pumping speed of the cementing unit while recording the pumping speed, pressure generated by the cementing unit and corresponding to the pumping speed, and cement flow rate generated by the cementing unit and corresponding to the pumping speed and/or pressure; then (2) maintaining the pumping speed while recording the pumping speed and the corresponding pressure and cement flow rate; and then (3) decreasing the pumping speed while recording the pumping speed and the corresponding pressure and cement flow rate until the cementing unit has stopped pumping cement and a volume of the pumped cement is substantially equal to the fluid volume set-point.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
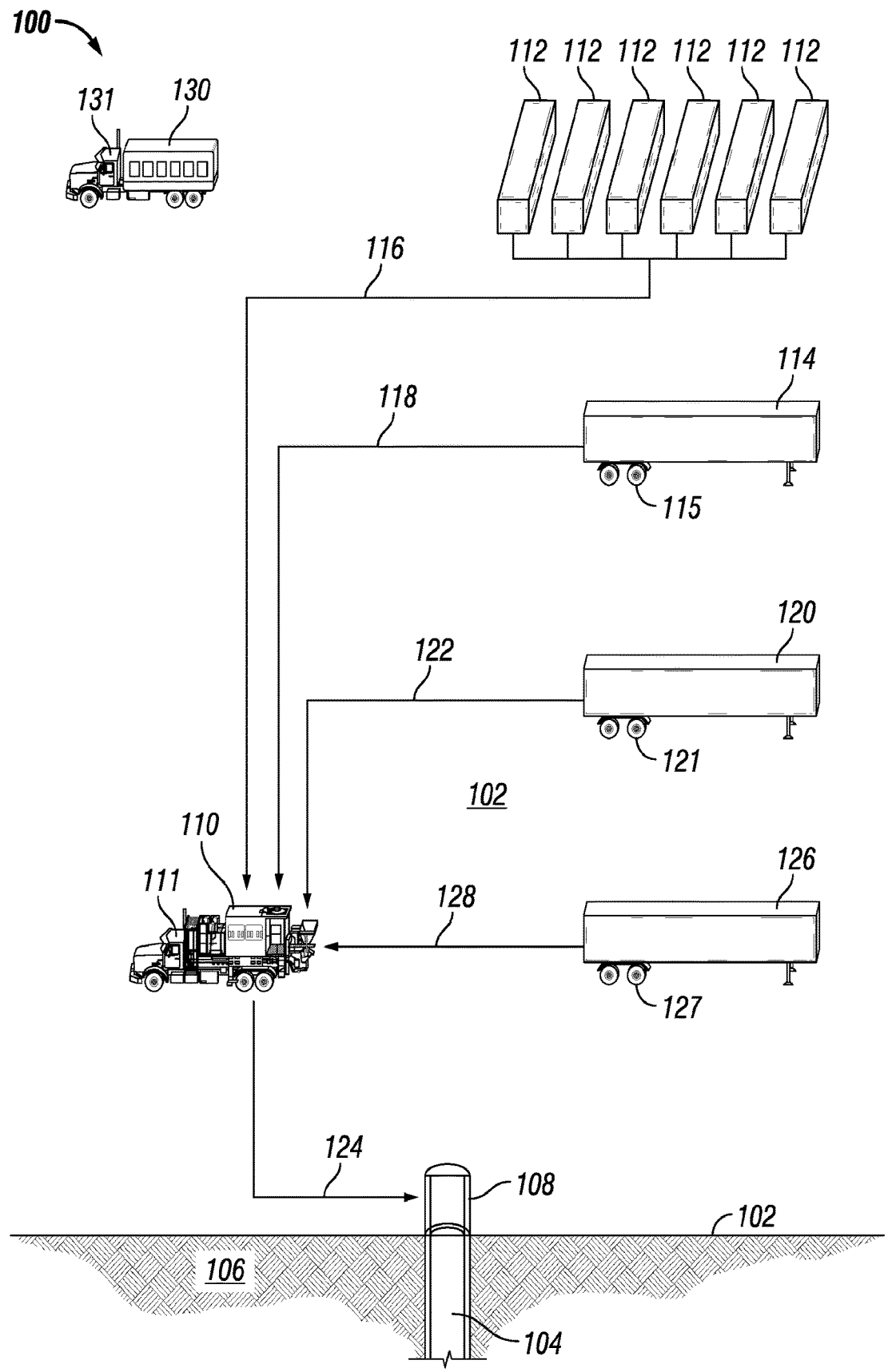
FIG. 1 is a schematic view of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of at least a portion of an example wellsite system 100 according to one or more aspects of the present disclosure. The figure depicts the wellsite system 100 located on a wellsite 102 adjacent a wellbore 104 and a partial sectional view of the subterranean formation 106 penetrated by the wellbore 104 below the wellsite 102. The wellbore 104 may terminate with a wellhead 108 at the wellsite 102. The wellsite system 100 may be operable to transfer various materials and additives from corresponding sources to a destination location for blending or mixing and eventual injection into the wellbore 104 during wellbore cementing operations.

The wellsite system 100 may comprise a cement mixing and pumping unit 110 (referred to hereinafter as a "cementing unit") fluidly connected with one or more tanks 112 and an additive container 114. The tanks 112 may contain that which is known in the art as a base fluid, which may be or comprise fresh water, brine, and/or mud. The container 114 may contain liquid or solid chemicals or additives operable to treat the base fluid. The additives may be or comprise accelerators, retarders, fluid-loss additives, dispersants, extenders, weighting agents, lost circulation additives, among other examples. The cementing unit 110 may be operable to receive the base fluid and one or more of the additives via fluid conduits 116, 118, and mix or otherwise combine the base fluid and the additives to form that which is known in the art as a mixed fluid.

The wellsite system 100 may further comprise a bulk container 120, which may contain a bulk material that is substantially different than the additives contained within the additive container 114. For example, the bulk material may be or comprise a cement powder or bulk cement, among other examples. The cementing unit 110 may be operable to receive the bulk cement from the bulk container 120 via a conduit 122, and mix or otherwise combine the mixed fluid and the bulk cement to form a mixture, which may be or comprise that which is known in the art as a cement slurry. The cementing unit 110 may then discharge or pump the cement slurry into the wellbore 104 via one or more fluid conduits 124 and/or the wellhead 108. The one or more fluid conduits 124 may be or comprise at least a portion of that which is known in the art as a treating line.

The wellsite system 100 may further comprise a batch mixer 126 operable to receive and mix predetermined quantities of the base fluid, additives, and/or bulk cement to form predetermined quantities or batches of the mixed fluid and/or cement slurry. If utilized to store the mixed fluid, the mixed fluid may be communicated to the cementing unit 110 via a fluid conduit 128 to be mixed with the bulk cement to form the cement slurry. If utilized to store the cement slurry, the cement slurry may be communicated to the cementing unit 110 via the fluid conduit 128 and pumped by the cementing unit 110 into the wellbore 104 via the fluid conduit 124 and/or the wellhead 108.

The wellsite system 100 may also comprise a control/power center 130, such as may be operable to provide control and/or centralized electric power distribution to one or more pieces of wellsite equipment or portions of the wellsite system 100. The control/power center 130 may be operable to monitor and control at least a portion of the wellsite system 100 during cementing operations. For example, the control/power center 130 may be operable to monitor and control one or more portions of the cementing unit 110 as well as pumps and/or conveyers (not shown) for moving the fluids, materials, and/or mixtures described above to the cementing unit 110. The control/power center 130 may comprise an engine-generator set, such as a gas turbine generator, an internal combustion engine generator, and/or other sources of electric power. Electric power and/or control signals may be communicated between the control/power center 130 and other wellsite equipment via electric conductors (not shown). However, other means of signal communication, such as wireless communication, are also within the scope of the present disclosure.

The cementing unit 110, the additive container 114, the bulk container 120, the batch mixer 126, and/or the control/power center 130 may each be disposed on corresponding trucks, trailers, and/or other mobile carriers 111, 115, 121, 127, 131, respectively, such as may permit their transportation to the wellsite 102. However, the cementing unit 110, the additive container 114, the bulk container 120, the batch mixer 126, and/or the control/power center 130 may be skidded or otherwise stationary, and/or may be temporarily or permanently installed at the wellsite 102.

FIG. 1 depicts the wellsite system 100 as being operable to form fluids and/or mixtures that may be pressurized and individually or collectively injected into the wellbore 104 during wellbore cementing operations. However, it is to be understood that the wellsite system 100 may be operable to mix and/or produce other mixtures and/or fluids that may be mixed by the cementing unit 110 and injected into the wellbore 104 during other oilfield operations, such as drilling, hydraulic fracturing, acidizing, chemical injecting, and/or water jet cutting operations, among other examples.

Figure 2:
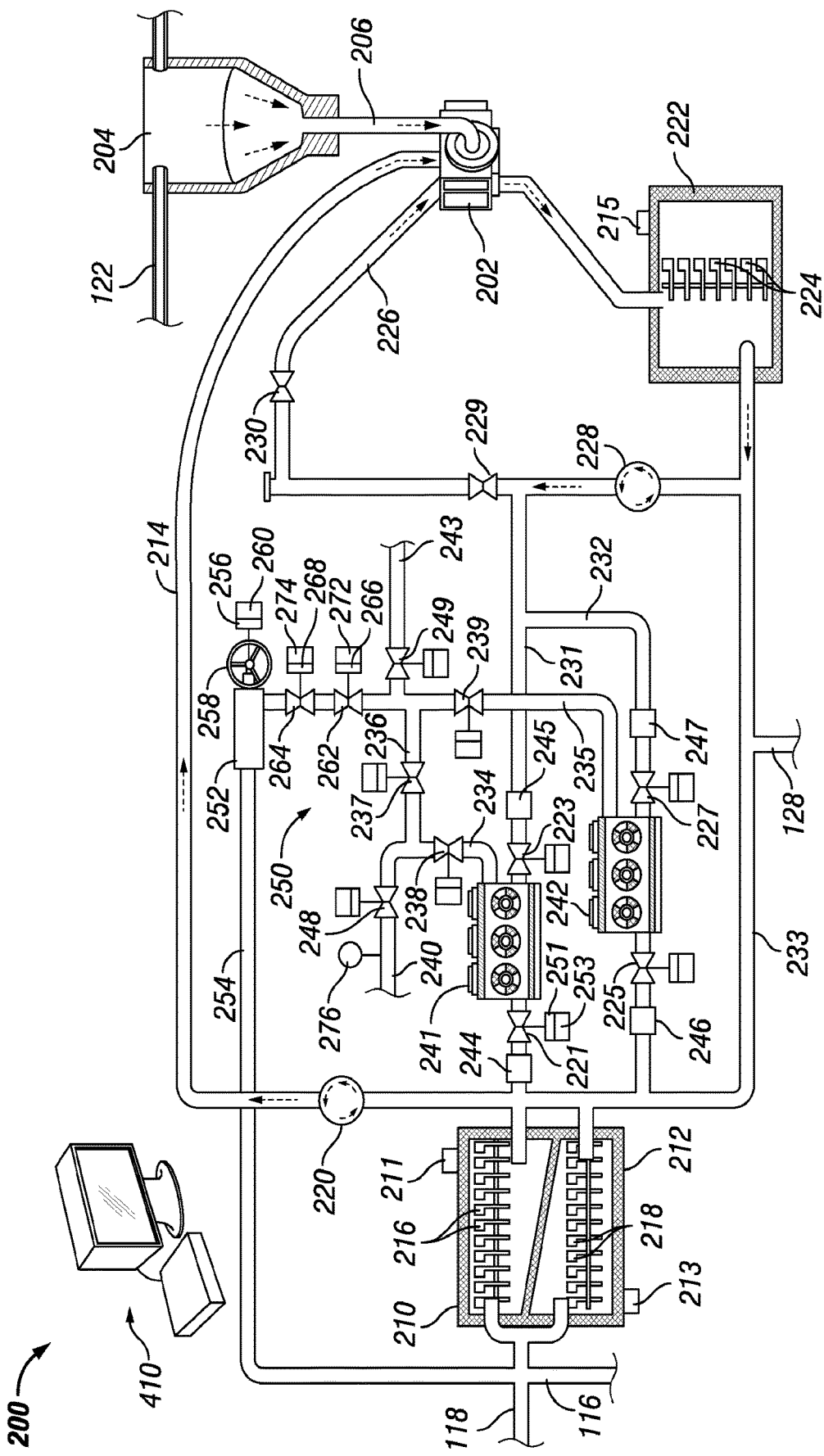
FIG. 2 is a schematic view of a portion of an example implementation of the apparatus shown in FIG. 1 according to one or more aspects of the present disclosure.

FIG. 2 is a schematic view of at least a portion of an example implementation of the cementing unit 110 shown in FIG. 1 according to one or more aspects of the present disclosure, and designated in FIG. 2 by reference numeral 200. The cementing unit 200 may be utilized in various implementations of a wellsite system. However, for the sake of clarity and ease of understanding, the cementing unit 200 is described below in the context of the wellsite system 100 shown in FIG. 1. Thus, the following description refers to FIGS. 1 and 2, collectively.

The cementing unit 200 comprises a mixer 202 operable to receive and mix or blend the bulk cement and the mixed fluid to form the cement slurry. The mixer 202 may be a vortex type mixer or another mixer operable to mix or blend liquids and solids. For example, the mixer 202 may receive the bulk cement from a container 204, which may temporarily store and/or direct the bulk cement received from the bulk container 120 via the conduit 122. The bulk cement may be transferred to the mixer 202 via a material transfer conduit 206, which may comprise a volumetric or mass dry metering device (not shown) operable to control the volumetric or mass flow rate of the bulk cement into the mixer 202. The bulk cement metering device may include a metering feeder, a screw feeder, an auger, and/or conveyor, among other examples.

The mixer 202 may receive the mixed fluid from displacement tanks 210, 212 via a fluid conduit 214. Each of the displacement tanks 210, 212 may receive the additives from the additive container 114 via the conduit 118 and the base fluid from the tanks 112 via the conduit 116. Within each of the displacement tanks 210, 212 a plurality of mixing blades or other agitators 216, 218 may agitate the mixture to uniformly blend the additives with the base fluid. Each of the displacement tanks 210, 212 may be or comprise a continuous flow channel or pathway for communicating or conveying the additives and the base fluid over a period of time sufficient to permit adequate blending to occur. Each displacement tank 210, 212 may have a first-in-first-out (FIFO) mode of operation, and may comprise a vessel-type outer housing enclosing a receptacle having an elongated flow pathway or space operable to store and communicate the contents therethrough. Metering systems (not shown), such as metering pumps and/or metering valves, may control the flow rate at which the additives and the base fluid are introduced into the displacement tanks 210, 212.

One or more fluid level sensors 211, 213 may be connected or otherwise disposed in association with each of the displacement tanks 210, 212. Each level sensor 211, 213 may be operable to generate signals or information indicative of the amount of base fluid, mixed fluid, or another fluid contained within a corresponding displacement tank 210, 212. Each fluid level sensor 211, 213 may comprise conductive, capacitive, vibrating, electromechanical, ultrasonic, microwave, nucleonic, and/or other level detection means, as well as load cells and/or other types of level sensors.

The cementing unit 200 may also include one or more devices operable to pump and/or meter the base fluid or mixed fluid from the displacement tanks 210, 212 to the mixer 202 via the fluid conduit 214. For example, the cementing unit 200 may include an injection pump 220 operable to pump the mixed fluid from the displacement tanks 210, 212 to the mixer 202. The injection pump 220 may be a metering pump, such as may be operable to control the flow rate at which the base fluid or mixed fluid is introduced into the mixer 202. The injection pump 220 may also be a centrifugal or another type of fluid pump. A metering valve (not shown) may be disposed along the fluid conduit 214 to further control the flow rate at which the base fluid or mixed fluid is introduced into the mixer 202.

A controller 410 may be operable to monitor and control one or more operations of the cementing unit 200. The controller 410 may be in communication with the various metering valves, metering pumps, and other metering systems described above to adjust or otherwise control density and solids fraction of the mixed fluid, the cement slurry, and/or other mixtures. For example, the controller 410 may be operable to control the volumetric flow rates at which the base fluid and the additives are introduced into the displacement tanks 210, 210, such as to control the concentration of the mixed fluid. The controller 410 may further control the volumetric flow rates at which the bulk cement and the mixed fluid are introduced into the mixer 202, such as to control density and solids fraction of the cement slurry.

The cement slurry may be selectively discharged from the mixer 202 and received by a mixing tank 222 wherein a plurality of mixing blades or other agitators 224 may agitate the cement slurry to further blend the base fluid and bulk cement. The mixing tank 222 may be or comprise a continuous flow channel or pathway for communicating or conveying the cement slurry over a period of time sufficient to permit adequate blending to occur, such that the cement slurry may reach a predetermined level viscosity and/or comprise other properties. The mixing tank 222 may have a FIFO mode of operation, and may comprise a vessel-type outer housing enclosing a receptacle having an elongated flow pathway or space operable to store and communicate the cement slurry therethrough.

A fluid level sensor 215 may be connected or otherwise disposed in association with the mixing tank 222. The level sensor 215 may be operable to generate signals or information indicative of the amount of cement slurry or another fluid contained within the mixing tank 222. The level sensor 215 may comprise the same structure and/or mode of operation as each of the fluid level sensors 211, 213 described above.

The cement slurry may be selectively recirculated through the mixer 202 via a recirculation flow path 226 comprising one or more fluid conduits. Recirculation of the cement slurry may be conducted, for example, to perform additional blending of the cement slurry and/or to introduce additional base fluid or bulk cement to the cement slurry, such as to change the composition and/or properties of the cement slurry. Flow control valves 229, 230 may be selectively opened to permit the cement slurry to recirculate through the recirculation flow path 226. During the recirculation operations, a pump 228 may be operable to recirculate or otherwise move the cement slurry through the recirculation flow path 226 from the mixing tank 222 to the mixer 202.

The cementing unit 200 may further comprise one or more high pressure pump units 241, 242 fluidly coupled to receive the fluids from the displacement tanks 210, 212 and the mixing tank 222 and discharge the fluids into the wellbore 104. For example, the pump units 241, 242 may receive the mixed fluid or the cement slurry via inlet conduits 231, 232 fluidly connected with the displacement tanks 210, 212 and the mixing tank 222. A bypass conduit 233 may extend between the displacement tanks 210, 212 and the mixing tank 222, bypassing the pump units 241, 242. The bypass conduit 233 may be fluidly connected with the conduit 128 and the inlet conduits 231, 232, such as may permit the mixed fluid or cement slurry from the batch mixer 126 to be received by the pump units 241, 242. Although the cementing unit 200 is shown comprising two pump units 241, 242, it is to be understood that the cementing unit 200 may include other quantities of pump units within the scope of the present disclosure.

One or more flow sensors 244, 245 may be disposed along the inlet conduit 231 or otherwise in association with the pump unit 241 in a manner permitting the sensing of a fluid flow rate generated by the pump unit 241. For example, the flow sensors 244, 245 may be fluidly coupled in association with fluid inlets 326 (shown in FIG. 3) of the pump unit 241. Each of the flow sensors 244, 245 may generate a signal or information indicative of a flow rate of the fluid introduced into the pump unit 241 and, thus, facilitate monitoring of the flow rate of the fluid discharged by the pump unit 241. Similarly, one or more flow sensors 246, 247 may be disposed along the inlet conduit 232 or otherwise in association with the fluid inlets 326 of the pump unit 242. Each of the flow sensors 246, 247 may generate a signal or information indicative of a flow rate of the fluid introduced into the pump unit 242 and, thus, facilitate monitoring of the flow rate of the fluid discharged by the pump unit 242.

An inlet valve 221, 223, 225, 227 may be disposed in association with each corresponding fluid inlet 326 of each pump unit 241, 242, such as to selectively fluidly connect and disconnect each pump unit 241, 242 from the mixing tank 222, the displacement tanks 210, 212, and/or other portions of the cementing unit 200. For example, the inlet valves 221, 223 may be coupled along the inlet conduit 231 on opposing sides of the pump unit 241. Similarly, the inlet valves 225, 227 may be coupled along the inlet conduit 232 on opposing sides of the pump unit 242.

The cementing unit 200 may further comprise outlet conduits 234, 235, each fluidly connected with a corresponding fluid outlet 335 (shown in FIG. 3) of each pump unit 241, 242. Each outlet conduit 234, 235 may include a corresponding fluid outlet valve 238, 239, which may selectively fluidly connect and disconnect each pump unit 241, 242 from the wellbore 104 and/or other portions of the cementing unit 200 located downstream from the fluid outlet valves 238, 239. The outlet conduits 234, 235 may be fluidly connected with each other via an intermediate or joining conduit 236. A fluid isolation valve 237 may be disposed along the joining conduit 236 to selectively fluidly connect and disconnect the outlet conduits 234, 235. The output conduits 234, 235 and the joining conduit 236 may be or comprise at least a portion of that which is known in the art as a treating or discharge manifold 250.

The outlet conduit 234 may be fluidly connected with a fluid conduit 240, which may be or form a portion of the fluid conduit 124 to fluidly couple the pump unit 241, and perhaps the pump unit 242, with the wellbore 104. The fluid conduit 240 may be or comprise at least a portion of that which is known in the art as a cement line 240, which may be utilized to inject the cement slurry into the wellbore 104 during cementing operations. The outlet conduit 235 may be fluidly connected with a fluid conduit 243, which may form a portion of the fluid conduit 124 to fluidly couple the pump unit 242, and perhaps pump unit 241, with the wellbore 104. The fluid conduit 243 may be or comprise at least a portion of that which is known in the art as a kill line 243, which may be utilized to inject the cement slurry into the wellbore 104 during well kill operations. The outlet conduit 234 may be selectively isolated from the cement line 240 by a fluid valve 248, while the outlet conduit 235 may be selectively isolated from the kill line 243 by a fluid valve 249. The discharge manifold 250, the fluid valves 237, 238, 239, 248, 249, the cement line 240, and the kill line 243 may be or comprise that which is known in the art as treating iron or equipment.

The fluid valves 221, 223, 225, 227, 237, 238, 239, 248, 249 may be or comprise ball valves, globe valves, butterfly valves, and/or other types of fluid valves, such as may be selectively opened and closed to permit and prevent fluid flow. Each fluid valve 221, 223, 225, 227, 237, 238, 239, 248, 249 may be actuated remotely by a corresponding actuator operatively coupled with each of the fluid valves 221, 223, 225, 227, 237, 238, 239, 248, 249. For clarity, just actuator 251 associated with the fluid inlet valve 221 is identified with a numeral in FIG. 2, however each of the other fluid valves 223, 225, 227, 237, 238, 239, 248, 249 may comprise a corresponding actuator having the same or similar structure and/or mode of operation. The actuator 251 may be or comprise an electric actuator, such as a solenoid or motor, or a fluid actuator, such as a pneumatic or hydraulic cylinder or rotary actuator. Each of the fluid valves 221, 223, 225, 227, 237, 238, 239, 248, 249 may also be actuated manually, such as by a lever (not shown).

Each fluid valve 221, 223, 225, 227, 237, 237, 238, 239, 248, 249 may also include a corresponding position sensor operable to generate a signal or information indicative of an actual position of a corresponding fluid valve 221, 223, 225, 227, 237, 237, 238, 239, 248, 249. The position sensors may be operable to monitor in-real time the actual position of the fluid valves 221, 223, 225, 227, 237, 237, 238, 239, 248, 249, which may include an open-flow position and a closed-flow position. For clarity, just position sensor 253 associated with the fluid inlet valve 221 is identified with a numeral in FIG. 2, however each of the other fluid valves 223, 225, 227, 237, 238, 239, 248, 249 may comprise a corresponding position sensor having the same or similar structure and/or mode of operation. Furthermore, each position sensor may be disposed in association with the corresponding fluid valve 221, 223, 225, 227, 237, 237, 238, 239, 248, 249 in a manner permitting sensing of the actual position of the corresponding fluid valve 221, 223, 225, 227, 237, 237, 238, 239, 248, 249. For example, each position sensor may monitor position, orientation, and/or rotation of a fluid-blocking portion of the corresponding fluid valve 221, 223, 225, 227, 237, 237, 238, 239, 248, 249 or another moving portion of the corresponding fluid valve 221, 223, 225, 227, 237, 237, 238, 239, 248, 249, such as a rotating shaft or stem. Each position sensor may be coupled with or disposed adjacent the corresponding fluid valve 221, 223, 225, 227, 237, 237, 238, 239, 248, 249, or each position sensor may be incorporated as a part of the corresponding fluid valve 221, 223, 225, 227, 237, 237, 238, 239, 248, 249. The position sensors may be or comprise proximity sensors, such as capacitive sensors, inductive sensors, magnetic sensors, Hall effect sensors, and/or reed switches, among other examples. The position sensors may also or instead include linear position sensors, such as linear potentiometers. The position sensors may also or instead include rotary position sensors, such as encoders, rotary potentiometers, synchros, resolvers, and/or rotary variable differential transformers (RVDT), among other examples.

The discharge manifold 250 may be fluidly connected with an adjustable choke valve 252, such as may be operable to bleed or otherwise relieve fluid pressure from the discharge manifold 250. The choke valve 252 may be operable to progressively open, such as to permit the pressurized fluid within the discharge manifold 250 to relieve or otherwise flow out of the discharge manifold 250 via a relief conduit 254. The relief conduit 254 may fluidly connect the discharge manifold 250 with the displacement tanks 210, 212, such as may permit the pressurized fluid within the discharge manifold 250 to be discharged into the displacement tanks 210, 212. The choke valve 252 may be or comprise a needle valve, a metering valve, a butterfly valve, a globe valve, or another valve operable to progressively or gradually open and close to control rate of fluid flow permitted through the choke valve 252.

The choke valve 252 may be remotely progressively opened and closed by a corresponding actuator 256 operatively coupled with the choke valve 252. The choke valve 252 may also be progressively opened and closed manually via a lever or a wheel 258. The choke valve 252 may also include a corresponding position sensor 260 operable to generate a signal or information indicative of an actual position of the choke valve, such as to monitor in-real time the actual position of the choke valve 252. The actual positions of the choke valve 252 may include a fully-open flow position, a fully-closed flow position, and intermediate or incremental positions between the fully-open flow position and the fully-closed flow positions. Each intermediate position may be indicative of an amount or percentage that the choke valve 252 is open and, thus, indicative of the flow rate through the choke valve 252. The actuator 256 and the position sensor 260 of the choke valve 252 may comprise the same or similar structure and/or mode of operation as the actuator 251 and the position sensor 253 described above. Also, the actuator 256 and the position sensors 260 may be disposed in association with the choke valve 252 in a manner that is similar in which the actuator 251 and the position sensor 253 are disposed in association with the fluid valve 221 described above.

The cementing unit 200 may further comprise bleed valves 262, 264, fluidly connected in series between the pump units 241, 242 and the choke valve 252. The bleed valves 262, 264 may be disposed along the outlet conduit 235 and may be operable to selectively fluidly connect and disconnect the choke valve 252 from the discharge manifold 250. The bleed valves 262, 264 may be or comprise ball valves, globe valves, butterfly valves, and/or other types of fluid valves, such as may be selectively opened and closed to permit and prevent fluid flow. Each bleed valve 262, 264 may be actuated remotely by a corresponding actuator 266, 268 operatively coupled in association with the bleed valves 262, 264. Each bleed valve 262, 264 may include a corresponding position sensor 272, 274 operatively connected thereto and operable to generate a signal or information indicative of an actual position of the each bleed valve 262, 264, such as to monitor in-real time the actual position of each bleed valve 262, 264. The actual positions of the bleed valves 262, 264 may include an open-flow position and a closed-flow position. The actuators 266, 268 and the position sensors 272, 274 may comprise the same or similar structure and/or mode of operation as the actuator 251 and the position sensor 253 described above. Also, the actuators 266, 268 and the position sensors 272, 274 may be disposed in association with the corresponding bleed valves 262, 264 in a manner that is similar in which the actuator 251 and the position sensor 253 are disposed in association with the fluid valve 221.

Figure 3:
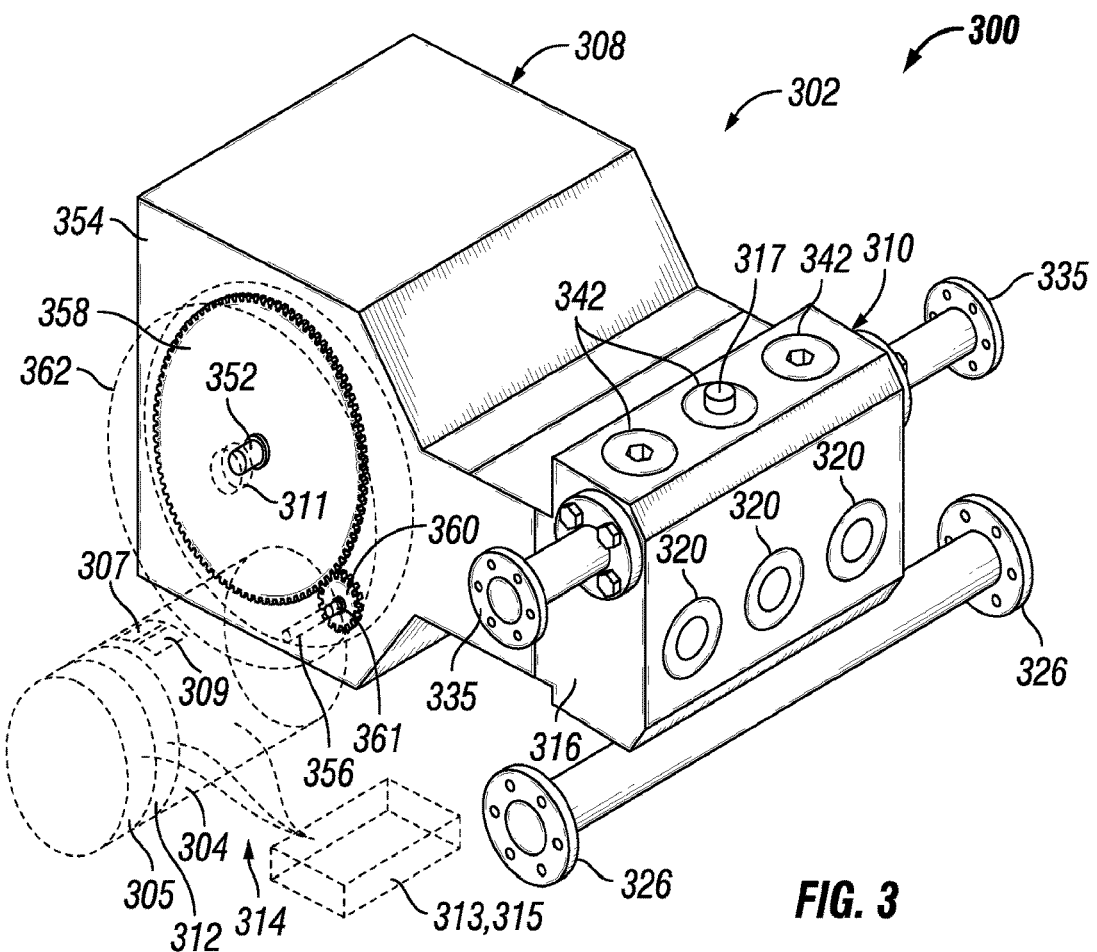
FIG. 3 is a perspective view of a portion of an example implementation of the apparatus shown in FIG. 2 according to one or more aspects of the present disclosure.

The cementing unit 200 may further comprise one or more pressure sensors disposed in association with the pump units 241, 242, the discharge manifold 250, and/or the cement line 240 in a manner permitting the sensing of fluid pressure within the pump units 241, 242, the discharge manifold 250, and/or the cement line 240. Each pressure sensor may be operable to generate an electrical signal and/or information indicative of the fluid pressure within the pump units 241, 242, the discharge manifold 250, and/or cement line 240. For example, a pressure sensor 276 may be disposed in association with the cement line 240, between the wellhead 108 and the fluid valve 248. As shown in FIG. 3, a pressure sensor 317 may also or instead be disposed in association with each pump unit 241, 242 to monitor the fluid pressure within each pump unit 241, 242 and/or at the corresponding fluid outlets 335.

The controller 410 may be further operable to monitor and control other operations of the cementing unit 200. To facilitate such monitoring and control, the controller 410 may be in communication with the valve actuators 251, 256, 266, 268 to permit the controller 410 to open and close or otherwise control the fluid valves 221, 223, 225, 227, 237, 238, 239, 248, 249, 252, 262, 264. The controller 410 may be in communication with the valve position sensors 253, 260, 272, 274 to permit the controller 410 to receive the feedback signals generated by the position sensors 253, 260, 272, 274 and, thus, verify that the valves 221, 223, 225, 227, 237, 238, 239, 248, 249, 252, 262, 264 transitioned to their intended position. The controller 410 may also be in communication with one or more portions of the pump units 241, 242, such as may permit the controller 410 to activate, deactivate, and control pumping or operating speed of the pump units 241, 242, as well as the flow rate and pressure generated by the pump units 241, 242. The controller 410 may also be in communication with the pressure sensors 276, 317, the flow sensors 244, 245, 246, 247, and the fluid level sensors 211, 213, 215, such as may permit the controller 410 to receive the information indicative of fluid pressure generated by the pump units 241, 242, the flow rate generated by the pump units 241, 242, and the amount of fluid available for pumping by the pump units 241, 242. Accordingly, the controller 410 may be operable to monitor and control one or more portions of the cementing unit 200, such as to control pressure, flow rates, and/or movement of fluids, including the base fluid, the mixed fluid, and the cement slurry, to implement the example methods and/or processes described herein.

Communication between the controller 410 and the various portions of the cementing unit 200 may be via wired and/or wireless communication means. However, for clarity and ease of understanding, such communication means are not depicted in FIG. 2, as a person having ordinary skill in the art will appreciate that such communication means are within the scope of the present disclosure. Furthermore, although the controller 410 is shown as being associated with the cementing unit 200, the controller 410 may be implemented as part of the control/power center 130 or otherwise located externally from the cementing unit 200.

Figure 4:
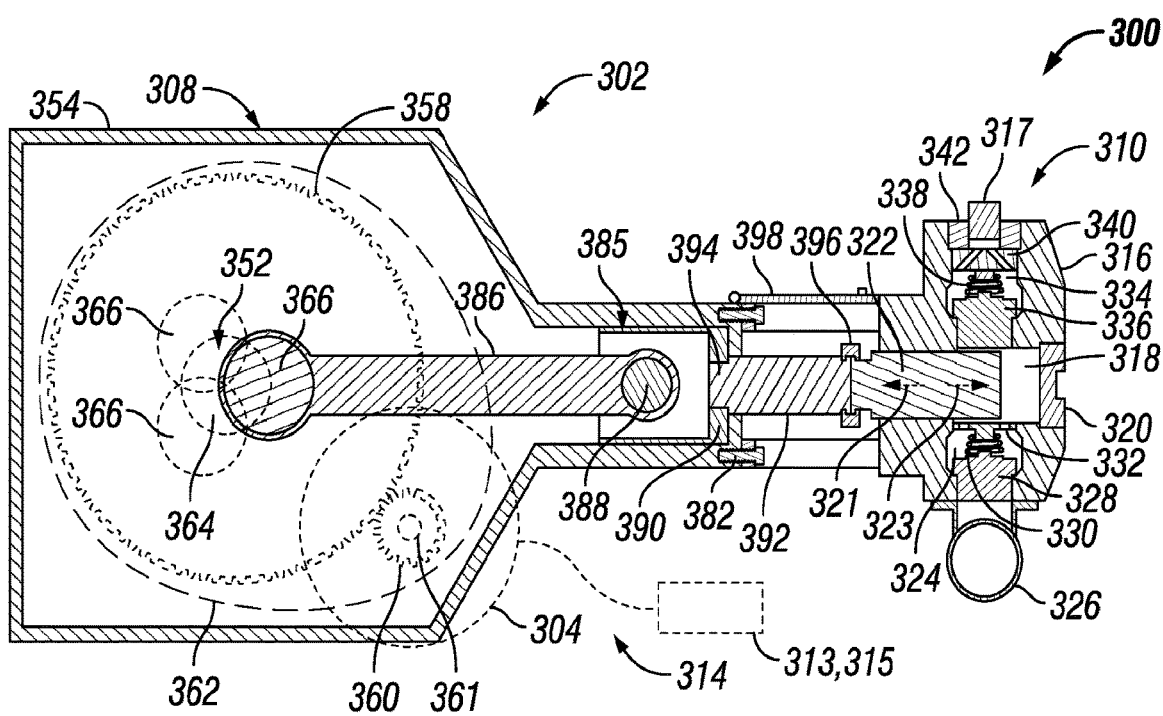
FIG. 4 is a sectional view of a portion of the apparatus shown in FIG. 3 according to one or more aspects of the present disclosure.

FIG. 3 is a perspective view of a portion of an example implementation of the pump unit 241, 242 shown in FIG. 2 according to one or more aspects of the present disclosure, and designated in FIG. 3 by reference numeral 300. FIG. 4 is a side sectional view of a portion of the pump unit 300 shown in FIG. 3. Portions of the pump unit 300 shown in FIGS. 3 and 4 are shown in phantom lines, such as to prevent obstruction from view of other portions of the pump unit 300. The following description refers to FIGS. 1-4, collectively.

The pump unit 300 comprises a pump 302 operatively coupled with and actuated by a prime mover 304. The pump 302 includes a power section 308 and a fluid section 310. The fluid section 310 may comprise a pump housing 316 having a plurality of fluid chambers 318. One end of each fluid chamber 318 may be plugged by a cover plate 320, such as may be threadedly engaged with the pump housing 316 while an opposite end of each fluid chamber 318 may contain a reciprocating member 322 slidably disposed therein and operable to displace the fluid within the corresponding fluid chamber 318. Although the reciprocating member 322 is depicted as a plunger, the reciprocating member 322 may also be implemented as a piston, diaphragm, or another reciprocating fluid displacing member.

Each fluid chamber 318 is fluidly connected with a corresponding one of a plurality of fluid inlet cavities 324 each adapted for communicating fluid from fluid inlets 326 into a corresponding fluid chamber 318. The fluid inlets 326 may be in fluid communication with a corresponding inlet conduit 231, 232. Each fluid inlet cavity 324 may contain an inlet valve 328 operable to control fluid flow from the fluid inlets 326 into the fluid chamber 318. Each inlet valve 328 may be biased toward a closed flow position by a first spring or another biasing member 330, which may be held in place by an inlet valve stop 332. Each inlet valve 328 may be actuated to an open flow position by a selected or predetermined differential pressure between the corresponding fluid inlet cavity 324 and the fluid inlets 326.

Each fluid chamber 318 is also fluidly connected with a fluid outlet cavity 334 extending through the pump housing 316 transverse to the reciprocating members 322. The fluid outlet cavity 334 is adapted for communicating pressurized fluid from each fluid chamber 318 into one or more fluid outlets 335 fluidly connected at one or both ends of the fluid outlet cavity 334. The fluid outlets 335 may be in fluid communication with a corresponding outlet conduit 234, 235. The fluid section 310 also contains a plurality of outlet valves 336 each operable to control fluid flow from a corresponding fluid chamber 318 into the fluid outlet cavity 334. Each outlet valve 336 may be biased toward a closed flow position by a spring or another biasing member 338, which may be held in place by an outlet valve stop 340. Each outlet valve 336 may be actuated to an open flow position by a selected or predetermined differential pressure between the corresponding fluid chamber 318 and the fluid outlet cavity 334. The fluid outlet cavity 334 may be plugged by cover plates 342, such as may be threadedly engaged with the pump housing 316.

During pumping operations, portions of the power section 308 of the pump unit 300 rotate in a manner that generates a reciprocating linear motion to move the reciprocating members 322 longitudinally within the corresponding fluid chambers 318, thereby alternatingly drawing and displacing the fluid within the fluid chambers 318. With regard to each reciprocating member 322, as the reciprocating member 322 moves out of the fluid chamber 318, as indicated by arrow 321, the pressure of the fluid inside the corresponding fluid chamber 318 decreases, thus creating a differential pressure across the corresponding fluid inlet valve 328. The pressure differential operates to compress the biasing member 330, thus actuating the fluid inlet valve 328 to an open flow position to permit the fluid from the fluid inlets 326 to enter the corresponding fluid inlet cavity 324. The fluid then enters the fluid chamber 318 as the reciprocating member 322 continues to move longitudinally out of the fluid chamber 318 until the pressure difference between the fluid inside the fluid chamber 318 and the fluid at the fluid inlets 326 is low enough to permit the biasing member 330 to actuate the fluid inlet valve 328 to the closed flow position. As the reciprocating member 322 begins to move longitudinally back into the fluid chamber 318, as indicated by arrow 323, the pressure of the fluid inside of fluid chamber 318 begins to increase. The fluid pressure inside the fluid chamber 318 continues to increase as the reciprocating member 322 continues to move into the fluid chamber 318 until the pressure of the fluid inside the fluid chamber 318 is high enough to overcome the pressure of the fluid inside the fluid outlet cavity 334 and compress the biasing member 338, thus actuating the fluid outlet valve 336 to the open flow position and permitting the pressurized fluid to move into the fluid outlet cavity 334, the fluid outlets 335, and the corresponding fluid outlet conduit 234, 235.

The pump unit 300 may further comprise a pressure sensor 317 disposed in association with the fluid section 310 in a manner permitting the sensing of fluid pressure at the fluid outlets 335. For example, the pressure sensor 317 may extend through one or more of the cover plates 342 or other portions of the corresponding pump housing 316 to monitor pressure within the fluid outlet cavity 334 and, thus, the fluid outlets 335 and the corresponding outlet conduits 234, 235.

The fluid flow rate generated by the pump unit 300 may depend on the physical size of the reciprocating members 322 and fluid chambers 318, as well as the pump unit operating speed, which may be defined by the speed or rate at which the reciprocating members 322 cycle or move within the fluid chambers 318. The pumping speed, such as the speed or the rate at which the reciprocating members 322 move, may be related to the rotational speed of the power section 308 and/or the prime mover 304. Accordingly, the fluid flow rate generated by the pump unit 300 may be controlled by controlling the rotational speed of the power section 308 and/or the prime mover 304.

The prime mover 304 may comprise an engine, such as a gasoline engine or a diesel engine, an electric motor, such as a synchronous or asynchronous electric motor, including a synchronous permanent magnet motor, a hydraulic motor, or another prime mover operable to drive or otherwise rotate a drive shaft 352 of the power section 308. The drive shaft 352 may be enclosed and maintained in position by a power section housing 354. To prevent relative rotation between the power section housing 354 and the prime mover 304, the power section housing 354 and prime mover 304 may be fixedly coupled together or to a common base, such as a trailer of the mobile carrier 111.

The prime mover 304 may comprise a rotatable output shaft 356 operatively connected with the drive shaft 352 by a gear train or transmission 362, which may comprise at least one spur gear 358 coupled with the drive shaft 352 and at least one pinion gear 360 coupled with a support shaft 361. The output shaft 356 and the support shaft 361 may be coupled, such as may facilitate transfer of torque from the prime mover 304 to the support shaft 361, the pinion gear 360, the spur gear 358, and the drive shaft 352. For clarity, FIGS. 3 and 4 show the transmission 362 comprising a single spur gear 358 engaging a single pinion gear 360, however, it is to be understood that the transmission 362 may comprise two or more sets of gears, such as may permit the transmission 362 to be shifted between different gear configurations to control the operating speed of the drive shaft 352 and/or torque transferred to the drive shaft 352. Accordingly, the transmission 362 may be shifted to control the rotational speed of the power section 308 and, thus, the pumping speed of the pump unit 300 to control the fluid flow rate generated by the pump unit 300.

The drive shaft 352 may be implemented as a crankshaft comprising a plurality of axial journals 364 and offset journals 366. The axial journals 364 may extend along a central axis of rotation of the drive shaft 352, while the offset journals 366 may be offset from the central axis of rotation by a selected or predetermined distance and spaced 120 degrees apart with respect to the axial journals 364. The drive shaft 352 may be supported in position within the power section 308 by the power section housing 354, wherein two of the axial journals 364 may extend through opposing openings in the power section housing 354.

The power section 308 and the fluid section 310 may be coupled or otherwise connected together. For example, the pump housing 316 may be fastened with the power section housing 354 by a plurality of threaded fasteners 382. The pump 302 may further comprise an access door 398, which may facilitate access to portions of the pump 302 located between the power section 308 and the fluid section 310, such as during assembly and/or maintenance of the pump 302.

To transform and transmit the rotational motion of the drive shaft 352 to a reciprocating linear motion of the reciprocating members 322, a plurality of crosshead mechanisms 385 may be utilized. For example, each crosshead mechanism 385 may comprise a connecting rod 386 pivotally coupled with a corresponding offset journal 366 at one end and with a pin 388 of a crosshead 390 at an opposing end. During pumping operations, walls and/or interior portions of the power section housing 354 may guide each crosshead 390, such as may reduce or eliminate lateral motion of each crosshead 390. Each crosshead mechanism 385 may further comprise a piston rod 392 coupling the crosshead 390 with the reciprocating member 322. The piston rod 392 may be coupled with the crosshead 390 via a threaded connection 394 and with the reciprocating member 322 via a flexible connection 396.

The pump unit 300 may further comprise one or more rotary sensors 311 operable to generate a signal or information indicative of rotational position, rotational speed, and/or operating frequency of the pump 302. For example, one or more of the rotary sensors 311 may be operable to convert angular position or motion of the drive shaft 352 or another rotating portion of the power section 308 to an electrical signal indicative of pumping speed of the pump unit 300. The rotary sensor 311 may be mounted in association with an external portion of the drive shaft 352 or other rotating members of the power section 308. The rotary sensor 311 may also or instead be mounted in association of the prime mover 304 to monitor the rotational position and/or rotational speed of the prime mover 304, which may be utilized to determine the pumping speed of the pump unit 300. The rotary sensor 311 may be or comprise an encoder, a rotary potentiometer, a synchro, a resolver, and/or an RVDT, among other examples.

The pump unit 300 may also include prime mover power and/or control components, such as a variable speed or frequency drive (VFD) 313 and/or an engine throttle control 315, which may be utilized to facilitate control of the prime mover 304 by the controller 410. The VFD 313/throttle control 315 may be connected with or otherwise in communication with the prime mover 304 via mechanical and/or electrical communication means 314. For example, the VFD 313 may receive control signals from the controller 410 and output corresponding electrical power to control the speed of the prime mover 304 and, thus, control the speed of the pump unit 300. The throttle control 315 may receive control signals from the controller 410 and output a corresponding electrical or mechanical throttle control signal to control the speed of the prime mover 304. Although the VFD 313/throttle control 315 is shown located near or in association with the prime mover 304, the VFD 313/throttle control 315 may be located or disposed at a distance from the prime mover 304. For example, the VFD 313/throttle control 315 may be or form a portion of the control/power center 130. The pump unit 300 may comprise the VFD 313 in implementations in which the prime mover 304 is or comprises an electric motor and the pump unit 300 may comprise the engine throttle control 315 in implementations in which the prime mover 304 is or comprises an engine.

The prime mover 304 may be cooled and/or lubricated by a lube pump unit 312 operatively coupled with the prime mover 304. The lube pump unit 312 may impart flow of lubricant through portions of the prime mover 304, such as to remove heat from the prime mover 304 and/or lubricate moving portions of the prime mover 304. The lube pump unit 312 may comprise a pump portion (not shown) and an actuator portion (not shown) operable to actuate the pump portion. The actuator portion of the lube pump unit 312 and, thus, the pumping operations of the lube pump unit 312 may be controlled and/or powered by the VFD 313, which may be connected with or otherwise in communication with the lube pump unit 312 via the communication means 314, such as electrical communication means. Functionality or operation of the lube pump unit 312 may be monitored or confirmed by monitoring lubricant pressure and/or lubricant flow rate generated by the lube pump unit 312. For example, the lubricant pressure and flow rate may be monitored by corresponding pressure and flow rate sensors (not shown) disposed in association with the lube pump unit 312 and in communication with the controller 410.

The prime mover 304 may also or instead be cooled by a cooling fan assembly or blower unit 305 disposed in association with the prime mover 304. The blower unit 305 may impart air movement, such as to remove heat from the prime mover 304 or otherwise prevent the prime mover 304 from overheating. The blower unit 305 may also remove heat from the lubricant being pumped by the lube pump unit 312. The blower unit 305 may comprise a plurality of blades (not shown) and an actuator portion (not shown) operable to actuate the blades. The actuator portion of the blower unit 305 and, thus, the cooling operations of the blower unit 305 may be controlled and/or powered by the VFD 313. The VFD 313 may be connected with or otherwise in communication with the blower unit 305 via the communication means 314, such as electrical communication means. Functionality or operation of the blower unit 305 may be monitored or confirmed by monitoring air pressure and/or air flow rate generated by the blower unit 305. The air pressure and air flow rate may be monitored by corresponding pressure and flow rate sensors (not shown) disposed in association with the blower unit 305 and in communication with the controller 410.

A temperature sensor 307, such as a resistance temperature detector (RTD), may be disposed in association with the prime mover 304, such as to generate a signal or information indicative of a temperature of the prime mover 304. For example, the temperature sensor 307 may monitor the temperature within a motor winding, an engine housing, or within another portion of the prime mover 304. The temperature sensor 307 may be in communication with the controller 410, which may shut down the prime mover 304 if the detected temperature level exceeds a predetermined temperature level.

A moisture sensor 309 may also be disposed in association with the prime mover 304, such as to generate a signal or information indicative of moisture present at or near the prime mover 304. The moisture sensor 309 may be in communication with the controller 410, which may shut down the prime mover 304 if the moisture is detected by the moisture sensor 309.

Although FIGS. 3 and 4 show the pump unit 300 comprising a triplex reciprocating pump 302, which has three fluid chambers 318 and three reciprocating members 322, implementations within the scope of the present disclosure may include the pump 302 as or comprising a quintuplex reciprocating pump having five fluid chambers 318 and five reciprocating members 322, or a pump having other quantities of fluid chambers 318 and reciprocating members 322. It is further noted that the pump 302 described above and shown in FIGS. 3 and 4 is merely an example, and that other pumps, such as diaphragm pumps, gear pumps, external circumferential pumps, internal circumferential pumps, lobe pumps, and other positive displacement pumps, are also within the scope of the present disclosure.

Figure 5:
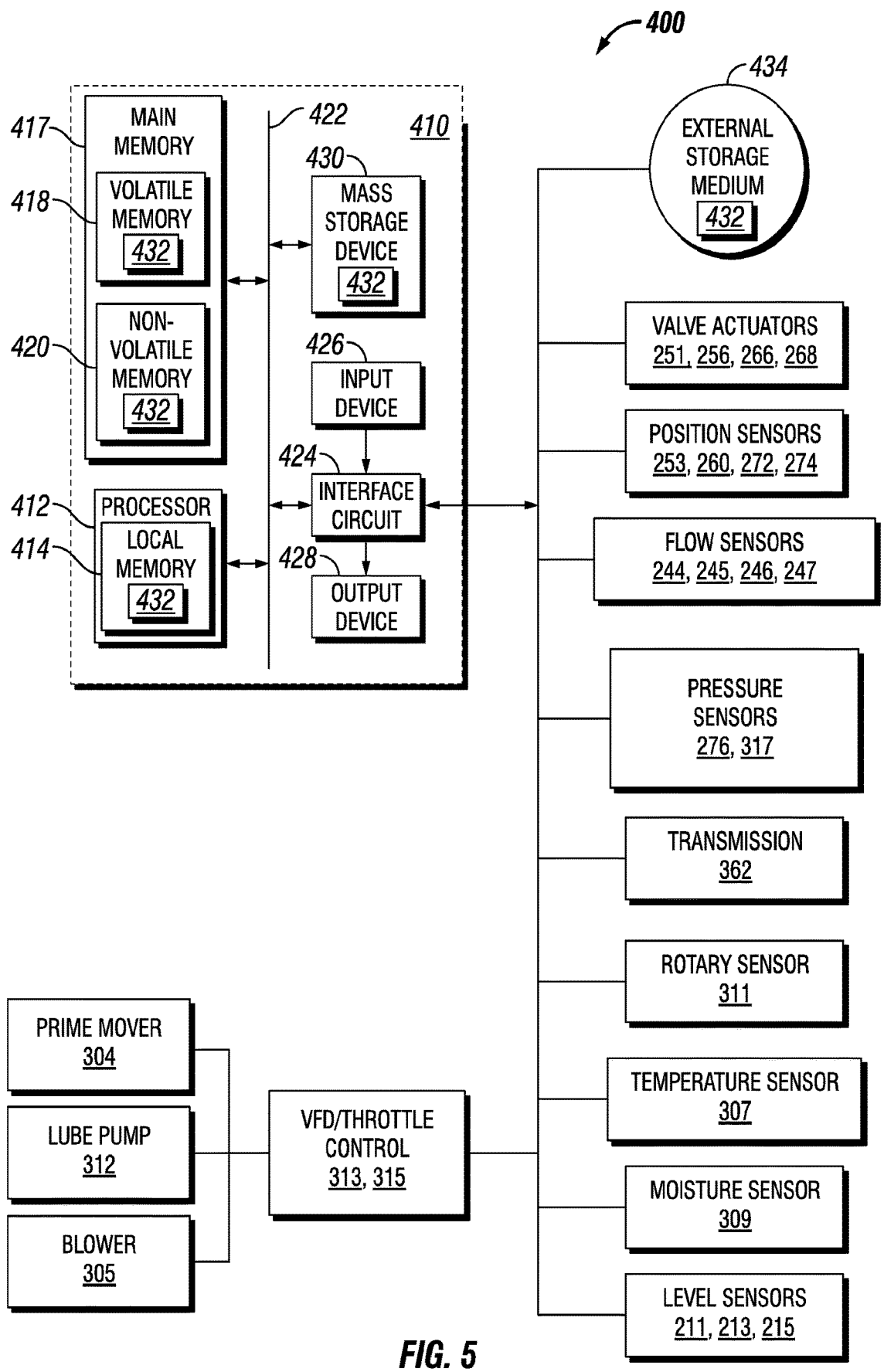
FIG. 5 is a schematic view of an example implementation of apparatus according to one or more aspects of the present disclosure.

Various portions of the cementing unit 200 described above may collectively form a control system 400, which may be operable to monitor and/or control operations of the cementing unit 200, including the fluid pressure and fluid flow rate generated by the pump units 241, 242. FIG. 5 is a schematic view of a portion of an example implementation of a control system 400 according to one or more aspects of the present disclosure. The following description refers to FIGS. 1-5, collectively.

The control system 400 may include the controller 410 in communication with the valve actuators 251, 256, 266, 268, the position sensors 253, 260, 272, 274, the flow sensors 244, 245, 246, 247, the pressure sensors 276, 317, the transmission 362, the rotary sensor 311, the temperature sensor 307, the moisture sensor 309, the fluid level sensors 211, 213, 215, and the prime mover 304, the lube pump unit 312, and the blower unit 305 via the VFD 313/throttle control 315. For clarity, these and other components in communication with the controller 410 will be collectively referred to hereinafter as "sensors and controlled components." The controller 410 may be operable to execute example machine-readable instructions to implement at least a portion of one or more of the example methods and/or processes described herein, and/or to implement at least a portion of one or more of the example systems described herein.

The controller 410 may be or comprise, for example, one or more processors, special-purpose computing devices, servers, personal computers, personal digital assistant (PDA) devices, smartphones, internet appliances, and/or other types of computing devices. The controller 410 may comprise a processor 412, such as a general-purpose programmable processor. The processor 412 may comprise a local memory 414, and may execute coded instructions 432 present in the local memory 414 and/or another memory device. The processor 412 may execute, among other things, machine-readable instructions or programs to implement the example methods and/or processes described herein. The programs stored in the local memory 414 may include program instructions or computer program code that, when executed by an associated processor, facilitate the cementing unit 200 to perform the example methods and/or processes described herein. The processor 412 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 412 may be in communication with a main memory 417, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or non-volatile memory 420. The controller 410 may be operable to store or record information entered by the human operators and/or information generated by the sensors and controlled components on the main memory.

The controller 410 may also comprise an interface circuit 424. The interface circuit 424 may be, comprise, or be implemented by various types of standard interfaces, such as an Ethernet interface, a universal serial bus (USB), a third generation input/output (3GIO) interface, a wireless interface, and/or a cellular interface, among others. The interface circuit 424 may also comprise a graphics driver card. The interface circuit 424 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensors and controlled components may be connected with the controller 410 via the interface circuit 424, such as may facilitate communication between the sensors and controlled components and the controller 410.

One or more input devices 426 may also be connected to the interface circuit 424. The input devices 426 may permit the human operators to enter the coded instructions 432, operational set-points, and/or other data into the processor 412. The operational set-points may include, but not limited to, a pressure ramp set-point, a pressure set-point, a pressure duration set-point, flow rate ramp set-point, a flow rate set-point, a fluid volume set-point, pump unit operating speed set-point, among other examples. Additional operational set-points may be described below. The input devices 426 may be, comprise, or be implemented by a keyboard, a mouse, a touchscreen, a track-pad, a trackball, an isopoint, and/or a voice recognition system, among other examples. One or more output devices 428 may also be connected to the interface circuit 424. The output devices 428 may be, comprise, or be implemented by display devices (e.g., a liquid crystal display (LCD) or cathode ray tube display (CRT), among others), printers, and/or speakers, among other examples. The controller 410 may also connect with one or more mass storage devices 430 and/or a removable storage medium 434, such as may be or include floppy disk drives, hard drive disks, compact disk (CD) drives, digital versatile disk (DVD) drives, and/or USB and/or other flash drives, among other examples.

The coded instructions 432, the operational set-points, and/or other data may be stored in the mass storage device 430, the main memory 417, the local memory 414, and/or the removable storage medium 434. Thus, the controller 410 may be implemented in accordance with hardware (perhaps implemented in one or more chips including an integrated circuit, such as an application specific integrated circuit), or may be implemented as software or firmware for execution by the processor 412. In the case of firmware or software, the implementation may be provided as a computer program product including a computer readable medium or storage structure embodying computer program code (i.e., software or firmware) thereon for execution by the processor 412.

The coded instructions 432 may include program instructions or computer program code that, when executed by the processor 412, may cause the cementing unit 200 to perform methods, processes, and/or routines described herein. For example, the controller 410 may receive and process the operational set-points and/or the signals or information generated by the various sensors described herein. Based on the received operational set-points and sensor information, the controller 410 may cause the cementing unit 200 and/or other portions of the wellsite system 100 to automatically perform and/or undergo one or more operations or routines within the scope of the present disclosure. For example, the controller 410 may cause the cementing unit 200 to perform an initialization of the cementing unit 200, a pressure calibration of the cementing unit 200, a pressure test of the cementing unit 200, a flow rate calibration of the cementing unit 200, a flow rate test of the cementing unit 200, a cement pumping operation of the cementing unit 200, among other examples, substantially without manual control of the various portions of the cementing unit 200 by human operators. The controller 410 may also assess operational health of the cementing unit 200, including the pump units 241, 242, the fluid valves 221, 223, 225, 227, 237, 238, 239, 248, 249, 252, 262, 264, and the discharge manifold 250. Also, if a plurality of cementing units 200 are utilized at the wellsite 102 to perform a cementing job or operation, the controller 410 may receive information designating which one or more of the plurality of cementing units 200 may perform the operations or routines described herein.

The pressure and flow rate tests may be performed by the cementing unit 200 before the cement pumping operations. For example, the pressure test may permit an automated verification that the high pressure portions of the cementing unit 200, including the manifold 250 and the fluid valves 237, 238, 239, 248, 249, 252, 262, 264, are properly fastened and that there are no leaks that may cause safety or service quality issues during the cement pumping operation. The pressure test may also validate that the cementing unit 200 is functioning well enough to reach intended high pressures to perform the cement pumping operation. The flow rate test may validate that the cementing unit 200, including the pump units 241, 242, is functioning well enough to reach intended high flow rates that may be utilized during the cement pumping operation. The cement pumping operation may include automated pumping of the cement slurry into the wellbore 104 in a predetermined manner and at a predetermined flow rate and/or pressure.

The initialization of the cementing unit 200 may be performed before the cement pumping operation to verify that the cementing unit 200 may pump the cement slurry at the intended flow rate and measure the cement flow rate accurately. During or after the initialization, the flow rate calibration of the cementing unit 200 may be performed. The flow rate calibration may include the controller 410 executing the coded instructions 432 or an algorithm to sweep through various prime mover speed settings and/or transmission gear settings to generate a baseline for a database comprising data points correlating a particular operating speed of the cementing unit 200 and a resulting flow rate generated by the cementing unit 200. During flow rate calibration, the coded instructions 432 may cause the controller 410 to increase the output flow rate of the cementing unit 200 to automatically and continuously check for deviations from an expected baseline behavior and utilize feedback, feedforward, and ramping control to update the database with the optimal correlation of the various cementing unit pumping speeds. Accordingly, the flow rate calibration may provide an estimated flow rate ramp indicative of fluid flow rate generated by the cementing unit 200 in response or with respect to the operating or pumping speed of the cementing unit 200. Accordingly, the estimated flow rate ramp may be utilized by the controller 410 to automatically control the pumping speed of the cementing unit 200 by controlling the prime mover 304 and/or transmission 362 to control the flow rate of the cement or other fluid during the cement pumping operation and/or another pumping operation.

During the initialization of the cementing unit 200, the pressure calibration of the cementing unit 200, the pressure test of the cementing unit 200, the flow rate calibration of the cementing unit 200, the flow rate test of the cementing unit 200, and the cement pumping operation of the cementing unit 200, the cementing unit 200 may utilize the pump units 241, 242 to pump water, brine, mud, the base fluid, the mixed fluid, the cement slurry, and/or other fluids from the mixing tank 222, the displacement tanks 210, 212, and/or other sources, such as the tanks 112, the container 114, and/or the batch mixer 126. Accordingly, unless described otherwise, the one or more fluids being pumped by the pump units 241, 242, may be referred to hereinafter simply as "a fluid."

Figure 6:
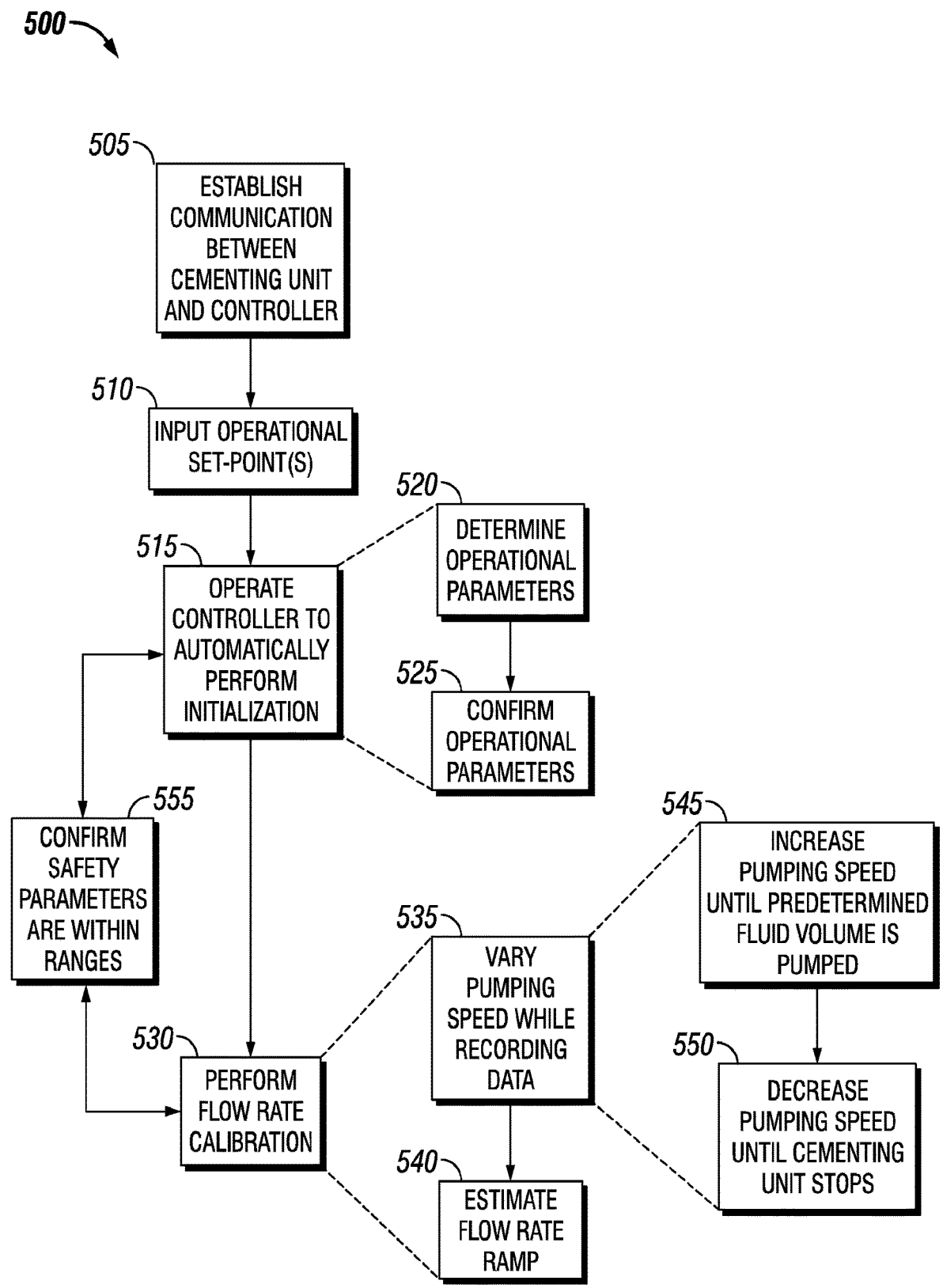
FIG. 6 is a flow-chart diagram of at least a portion of an example implementation of a method according to one or more aspects of the present disclosure.

FIG. 6 is a flow-chart diagram of at least a portion of an example implementation of a method (500) according to one or more aspects of the present disclosure. The method (500) may be performed utilizing or otherwise in conjunction with at least a portion of one or more implementations of one or more instances of the apparatus shown in one or more of FIGS. 1-5 and/or otherwise within the scope of the present disclosure. For example, the method (500) may be performed and/or caused, at least partially, by the controller 410 executing the coded instructions 432 according to one or more aspects of the present disclosure. Thus, the following description of the method (500) also refers to apparatus shown in one or more of FIGS. 1-5. However, the method (500) may also be performed in conjunction with implementations of apparatus other than those depicted in FIGS. 1-5 that are also within the scope of the present disclosure.

The method (500) may comprise establishing (505) communication between the cementing unit 200 and the controller 410. As described above, the controller 410 is operable to control operation of the cementing unit 200, such as via operation of the processor 412, the memory 417, and the computer program code 432. The method (500) may further comprise inputting (510) operational set-points, such as may be utilized by the controller 410 to automatically perform a flow rate calibration and/or other operation of the cementing unit 200. Such inputs (510) may be performed by a human operator via the input devices 426 described above, although the controller 410 may also be operable to retrieve the inputs as predetermined values/ranges included in the computer program code 432.

The method (500) also comprises operating (515) the controller 410 to automatically perform initialization of operation of the cementing unit 200. The initialization may comprise automatically determining (520) operational parameters related to operational status of the cementing unit 200 based on the information generated by the sensors 253, 244, 276, 307, 309, 311, 317, and confirming (525) the operational parameters are within corresponding predetermined ranges. The operational parameters may comprise at least one of cementing unit temperature, cementing unit pressure, presence of moisture in association with the cementing unit, cementing unit cooling system pressure, and cementing unit lubrication system pressure, among other examples.

The determination (520) and confirmation (525) of the operational parameters may be or comprise a pre-calibration parameter condition check performed by the controller 410, such as may include monitoring the operational parameters or signals from the various sensors 253, 244, 276, 307, 309, 311, 317 and confirming that the detected operational parameters are within the corresponding predetermined ranges. If the detected parameters match or are within the predetermined parameters, pre-conditions are met and the initialization may continue. For example, the controller 410 may monitor the temperature sensor 307 to verify that the temperature of the prime mover 304 does not exceed a predetermined threshold. The controller 410 may also monitor the moisture sensor 309 to check if the prime mover 304 is exposed to moisture. If the temperature of the prime mover 304 is greater than, for example, 170° Celsius (° C.) or if the prime mover 304 is exposed to moisture, the initialization (515) may be stopped. The controller 410 may also monitor functionality of the lube pump unit 312 and/or the blower unit 305 by monitoring the lubricant and air pressure and/or flow rate.

The initialization and/or other portion of the method (500) may also comprise performing (530) the flow rate calibration and/or other operation utilizing the entered (510) operational set-points. The operational set-points may relate to at least one of a fluid volume to be pumped by the cementing unit 200 and a pumping speed of the cementing unit 200 during the performance (530) of the flow rate calibration and/or other operation.

For example, performing (530) the flow rate calibration may comprise varying (535) pumping speed of the cementing unit 200 while recording the pumping speed and a corresponding flow rate generated by the cementing unit, and estimating or otherwise determining (540) a flow rate ramp relating the flow rate to the pumping speed. The flow rate ramp may relate the recorded fluid flow rate generated by the cementing unit 200 to the recorded pumping speed or operating rate of the cementing unit 200. The flow rate ramp may be utilized as an estimate or projection of an actual fluid flow rate in response to the pumping speed during cement or other pumping operations. The flow rate ramp may be utilized during the cement pumping operations or other pumping operations to control the fluid flow rate by controlling the pumping speed of the cementing unit 200.

Varying (535) the pumping speed may comprise increasing (545) the pumping speed of the cementing unit 200 while recording the pumping speed and the corresponding flow rate generated by the cementing unit until a predetermined fluid volume is pumped by the cementing unit 200. Varying (535) the pumping speed may further comprise decreasing (550) the pumping speed of the cementing unit 200 while recording the pumping speed and the corresponding flow rate generated by the cementing unit 200 until the cementing unit 200 stops pumping the fluid. Varying (535) the pumping speed of the cementing unit 200 may be performed by varying the speed of the prime mover 304 via the VFD/engine throttle 313, 315 and/or by shifting between lower and higher speeds or gear ratios of the transmission 362.

The pumping speed may be increased (545) by a first incremental speed set-point until the predetermined fluid volume is pumped, and the pumping speed may be decreased (550) by a second incremental speed set-point until the cementing unit 200 stops pumping the fluid. In an example implementation, the first and second incremental speed set-points may range between about one and about five revolutions per minute (RPM) for each flow rate and pumping speed reading performed by the controller 410. The predetermined fluid volume may range, for example, between about 50 barrels (BBL) and about 200 BBL of fluid.

Performing (530) the flow rate calibration may further comprise the controller 410, before varying the pumping speed, confirming that the cementing unit 200 has stopped pumping, confirming that the cementing unit 200 is depressurized, detecting a volume of fluid available for performing the flow rate calibration, and opening (and/or confirming to be open) fluid inlet valves 221, 223, 225, 227 and fluid outlet valves 238, 239 of the cementing unit 200. The controller 410 may confirm that the cementing unit 200 has stopped via the rotary sensors 311. The controller 410 may confirm that the cementing unit 200 is depressurized if the pressure detected by the pressure sensor 317 ranges, for example, between about zero and about 100 pounds per square inch (PSI). Furthermore, the controller 410 may confirm that the fluid volume available for performing the flow rate calibration is sufficient if, for example, the fluid level sensors 211, 213, 215 indicate between about 50 BBL and about 200 BBL of fluid. Also, the controller 410 may confirm that the fluid inlet valves 221, 223, 225, 227 and the fluid outlet valves 238, 239 are open via the valve position sensors 253.

The method (500) may further comprise operating the controller 410 to automatically confirm (555) that safety parameters are within corresponding predetermined ranges. Safety parameters may include pressure and temperature readings, which if exceeding the predetermined ranges, may cause the controller 410 to shut down the initialization. For example, a predetermined threshold of safety related to the prime mover 304 may be a temperature exceeding 170° C. A predetermined threshold of safety related to the pump units 241, 242 may be a pressure exceeding 20,000 PSI or another pressure exceeding pump unit specifications. A sudden pressure drop detected, for example, within the pump units 241, 242 and/or the manifold 250 may be indicative of a leak or structural failure and may also cause the controller 410 to shut down the initialization. The automatic confirmation (555) that safety parameters are within corresponding predetermined ranges may be perform before, during, and/or after the initialization (515), the flow rate calibration (530), and/or other operations of the cementing unit 200.

Figure 7:
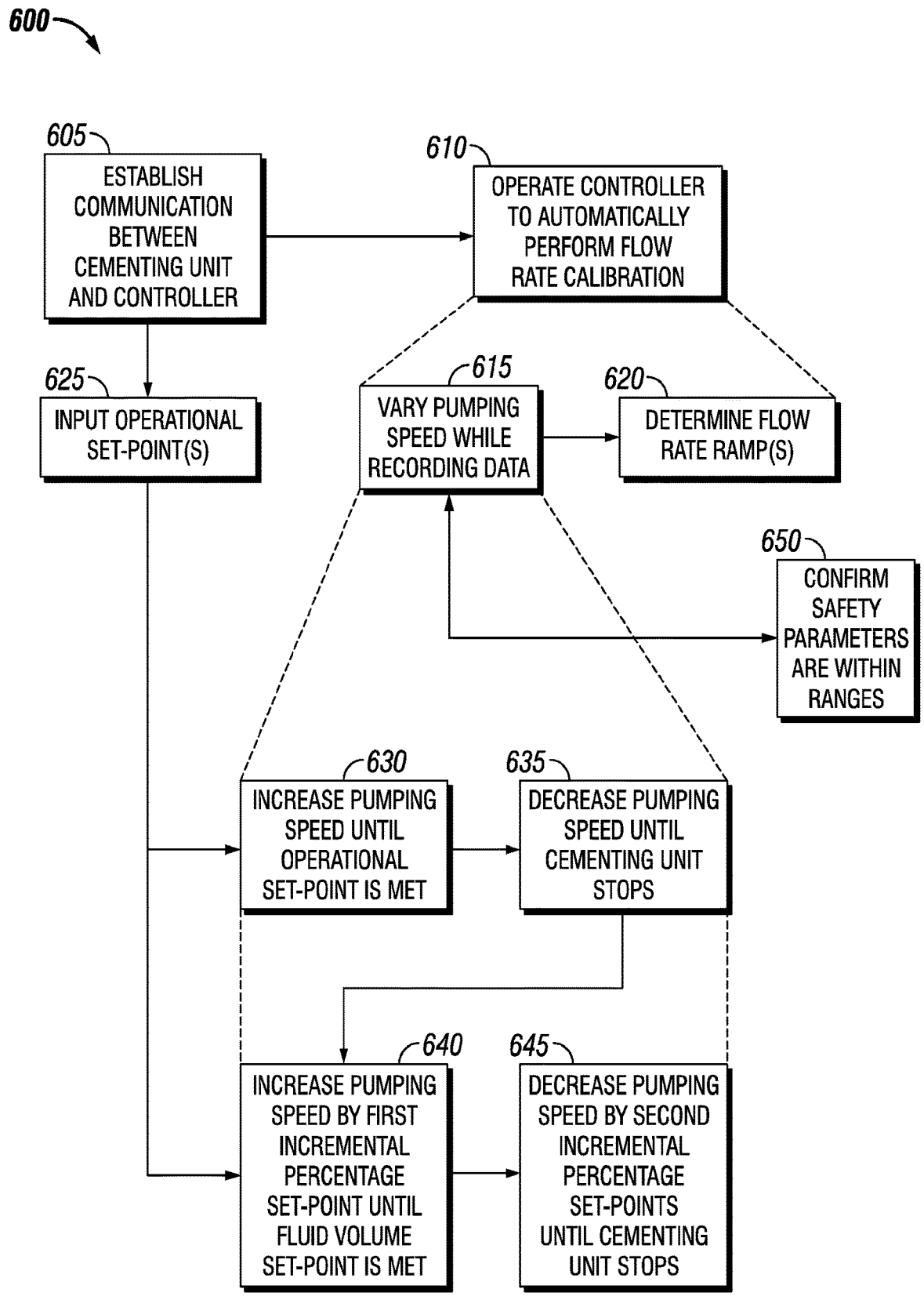
FIG. 7 is a flow-chart diagram of at least a portion of an example implementation of a method according to one or more aspects of the present disclosure.

FIG. 7 is a flow-chart diagram of at least a portion of an example implementation of another method (600) according to one or more aspects of the present disclosure. The method (600) may be performed utilizing or otherwise in conjunction with at least a portion of one or more implementations of one or more instances of the apparatus shown in one or more of FIGS. 1-5 and/or otherwise within the scope of the present disclosure. For example, the method (600) may be performed and/or caused, at least partially, by the controller 410 executing the coded instructions 432 according to one or more aspects of the present disclosure. Thus, the following description of the method (600) also refers to apparatus shown in one or more of FIGS. 1-5. However, the method (600) may also be performed in conjunction with implementations of apparatus other than those depicted in FIGS. 1-5 that are also within the scope of the present disclosure.

The method (600) may comprise establishing (605) communication between the cementing unit 200 and the controller 410. The method (600) also comprises operating (610) the controller 410 to automatically perform a flow rate calibration of the cementing unit 200. Automatically performing (610) the flow rate calibration may include automatically varying (615) the pumping speed of the cementing unit 200 while recording the pumping speed monitored by the rotary sensor 311 and a corresponding flow rate of the cementing unit 200 monitored by the flow sensors 244, 245, 246, 247. The pumping speed may be controlled by controlling the operating speed of the prime mover 304 and/or the gear settings of the transmission 362. A flow rate ramp relating the flow rate to the pumping speed is then estimated or otherwise determined (620) based on the recorded (615) data.

The method (600) may further include inputting (625) one or more operational set-points, such as a predetermined fluid volume to be pumped by the cementing unit 200. Such inputs (625) may be performed by a human operator via the input devices 426 described above, although the controller 410 may also be operable to retrieve the inputs as predetermined values/ranges included in the computer program code 432. Varying (615) the pumping speed may comprise increasing (630) the pumping speed while recording the pumping speed and the corresponding flow rate generated by the cementing unit 200 until the predetermined fluid volume or other operational set-point is met, and decreasing (635) the pumping speed of the cementing unit 200 while recording the pumping speed and the corresponding flow rate generated by the cementing unit 200 until the cementing unit 200 stops pumping a fluid. For example, the operational set-point may be a predetermined range of the fluid volume to be pumped by the cementing unit 200, such as between about 20 BBL and about 100 BBL of fluid, and/or between about 20% and about 30% of a fluid volume allocated for the performance (610) of the flow rate calibration.

The entered (625) set-points may also comprise first and second incremental speed set-points, such that the pumping speed may be increased (630) by the first incremental speed set-point until the operational set-point is met, and the pumping speed may be decreased (635) by the second incremental speed set-point until the cementing unit 200 stops pumping the fluid. For example, the first and second incremental speed set-points may range between about one and about five RPM for each flow rate and pumping speed recording (615) performed by the controller 410.

The entered (625) set-points may also comprise a first incremental percentage set-point, a second incremental percentage set-point, a fluid flow rate set-point, and a fluid volume set-point. For example, determining (620) the flow rate ramp may include determining a first flow rate ramp based on the data recorded (615) while increasing (630) and decreasing (635) the pumping speed, and varying (615) the pumping speed while recording data may further comprise increasing (640) the pumping speed by a speed corresponding to the first incremental percentage set-point of the fluid flow rate set-point based on the first flow rate ramp while recording the pumping speed monitored by the rotary sensor 311 and the corresponding flow rate of the cementing unit 200 monitored by the flow sensors 244, 245, 246, 247 until the fluid volume set-point is met. Varying (615) the pumping speed may further comprise decreasing (645) the pumping speed by a speed corresponding to the second incremental percentage set-point of the fluid flow rate set-point based on the first flow rate ramp while recording the pumping speed monitored by the rotary sensor 311 and a corresponding flow rate of the cementing unit 200 monitored by the flow sensors 244, 245, 246, 247 until the cementing unit stops pumping the fluid. Determining (620) the flow rate ramp(s) may thus also comprise determining a second flow rate ramp relating the flow rate to the pumping speed after the first flow rate ramp was estimated, based on the data recorded (615) during the second pump speed increase (640) and/or decrease (645) and/or the first flow rate ramp.

Similarly to the first flow rate ramp, the second flow rate ramp may relate the recorded fluid flow rate to the recorded pumping speed. However, in determining (620) the second flow rate ramp, the controller 410 may cause the cementing unit 200 to increase (640) and then decrease (645) by the first and second incremental percentage set-points of the fluid flow rate set-point. Accordingly, the controller 410 may increase (640) and decrease (645) the flow rate of the cementing unit 200 by the incremental percentage set-points by increasing and decreasing the operating speed of the cementing unit 200 by a speed that corresponds to the incremental percentage set-point of the fluid flow rate set-point based on the first flow rate ramp.

In an example implementation, the first and second incremental percentage set-points may each range between about 1% and about 10% of the fluid flow rate set-point. The fluid flow rate set-point may range, for example, between about four BBL per minute (BPM) and about ten BPM. The fluid volume set-point may range between about 50 BBL and about 200 BBL of fluid. The fluid volume set-point may instead range, for example, between about 70% and about 80% of the fluid volume allocated for performance (610) of the flow rate calibration.

Similarly to as described above with respect to performing (530) the flow rate calibration of the method (500) shown in FIG. 6, performing (610) the flow rate calibration may further comprise, before varying (615) the pumping speed, confirming that the cementing unit 200 has stopped pumping, confirming that the cementing unit 200 is depressurized, detecting a volume of fluid available for the performance (610) of the flow rate calibration, and opening the fluid inlet valves 221, 223, 225, 227 and fluid outlet valves 238, 239 of the cementing unit 200. The method (600) may also comprise operating the controller 410 to automatically confirm (650) that safety parameters are within corresponding predetermined ranges before, during, and/or after the performance (610) of the flow rate calibration, such as before, during, and/or after varying (615) the pumping speed while recording data as described above.

Figure 8:
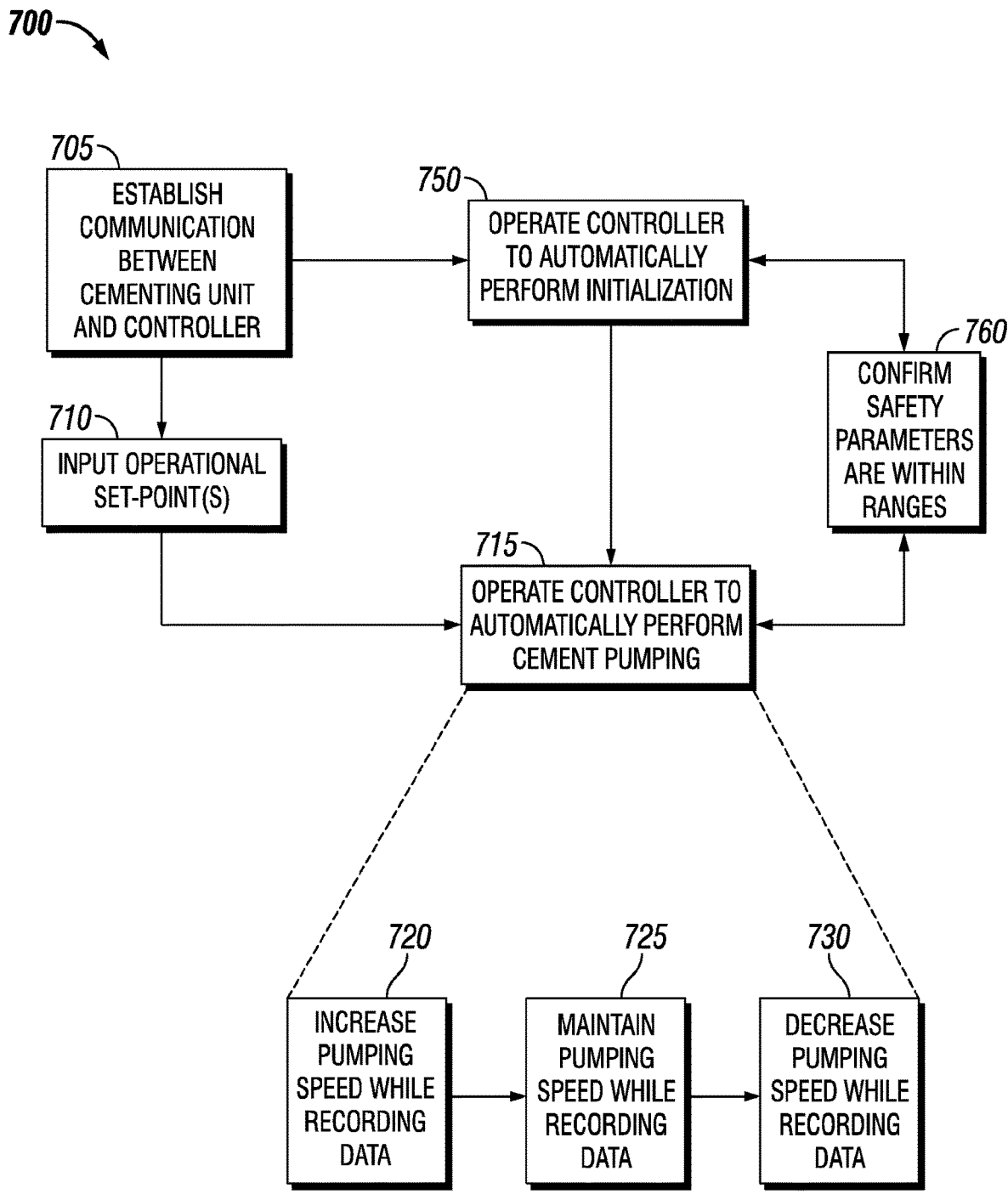
FIG. 8 is a flow-chart diagram of at least a portion of an example implementation of a method according to one or more aspects of the present disclosure.

FIG. 8 is a flow-chart diagram of at least a portion of an example implementation of another method (700) according to one or more aspects of the present disclosure. The method (700) may be performed utilizing or otherwise in conjunction with at least a portion of one or more implementations of one or more instances of the apparatus shown in one or more of FIGS. 1-5 and/or otherwise within the scope of the present disclosure. For example, the method (700) may be performed and/or caused, at least partially, by the controller 410 executing the coded instructions 432 according to one or more aspects of the present disclosure. Thus, the following description of the method (700) also refers to apparatus shown in one or more of FIGS. 1-5. However, the method (700) may also be performed in conjunction with implementations of apparatus other than those depicted in FIGS. 1-5 that are also within the scope of the present disclosure.

The method (700) may comprise establishing (705) communication between the cementing unit 200 and the controller 410. The method (700) may also comprise inputting (710) one or more set-points. For example, an input (710) set-point may be a fluid volume set-point, such as may range between about 50 BBL and about 500 BBL of fluid, although other values/ranges are also within the scope of the present disclosure. The inputs (710) may be performed by a human operator via the input devices 426 described above, although the controller 410 may also be operable to retrieve the inputs as predetermined values/ranges included in the computer program code 432.

The method also comprises operating (715) the controller 410 to automatically perform a cement pumping operation of the cementing unit 200. Performing (715) the cement pumping operation may comprise automatically increasing (720) pumping speed of the cementing unit 200 while recording the pumping speed, the pressure generated by the cementing unit 200 corresponding to the pumping speed, and the cement flow rate corresponding to the pumping speed and/or pressure. Performing (715) the cement pumping operation may then comprise automatically maintaining (725) the pumping speed while recording the pumping speed and the corresponding pressure and cement flow rate, and then decreasing (730) the pumping speed while recording the pumping speed and the corresponding pressure and cement flow rate until the cementing unit 200 has stopped pumping cement and the volume of the pumped cement is substantially equal to the fluid volume set-point.

The input (710) set-points may also comprise a fluid flow rate set-point. For example, the cement pumping operation (715) may comprise increasing (720) pumping speed to reach the flow rate set-point and maintaining (725) the pumping speed to maintain the fluid flow rate set-point. The fluid flow rate set-point may range, for example, between about four BPM and about ten BPM. The fluid flow rate may be increased (720) and decreased (730), for example, at a rate ranging between about 0.50 BPM/minute and about 5 BPM/minute.

Similarly to as described above with respect to the method (500), operation (715) of the controller 410 for the cementing operation may further comprise, before increasing (720), maintaining (725), and decreasing (730) the pumping speed, confirming that the cementing unit 200 has stopped pumping and is depressurized, confirming that a volume of fluid is available for performing the cement pumping operation, and opening (and/or confirming to be open) the fluid inlet valves 221, 223, 225, 227 and fluid outlet valves 238, 239 of the cementing unit 200.

The method (700) may also comprise operating (750) the controller 410 to initialize the cementing unit 200, as described above with respect to FIG. 6. The method (700) may also comprise confirming (760) that safety parameters are within predetermined ranges, similar to as described above. Such confirmation (760) may be performed before, during, and/or after the initialization (750) and/or the cementing operation (715). For example, such confirmation (760) may be or comprise a pre-calibration parameter condition check performed by the controller 410, such as may include monitoring the operational parameters or signals from the various sensors 253, 244, 276, 307, 309, 311, 317 and confirming that the detected operational parameters are within the corresponding predetermined ranges. If the detected parameters match the predetermined parameters, pre-conditions are met and the cementing operation (715) may continue.

Figure 9:
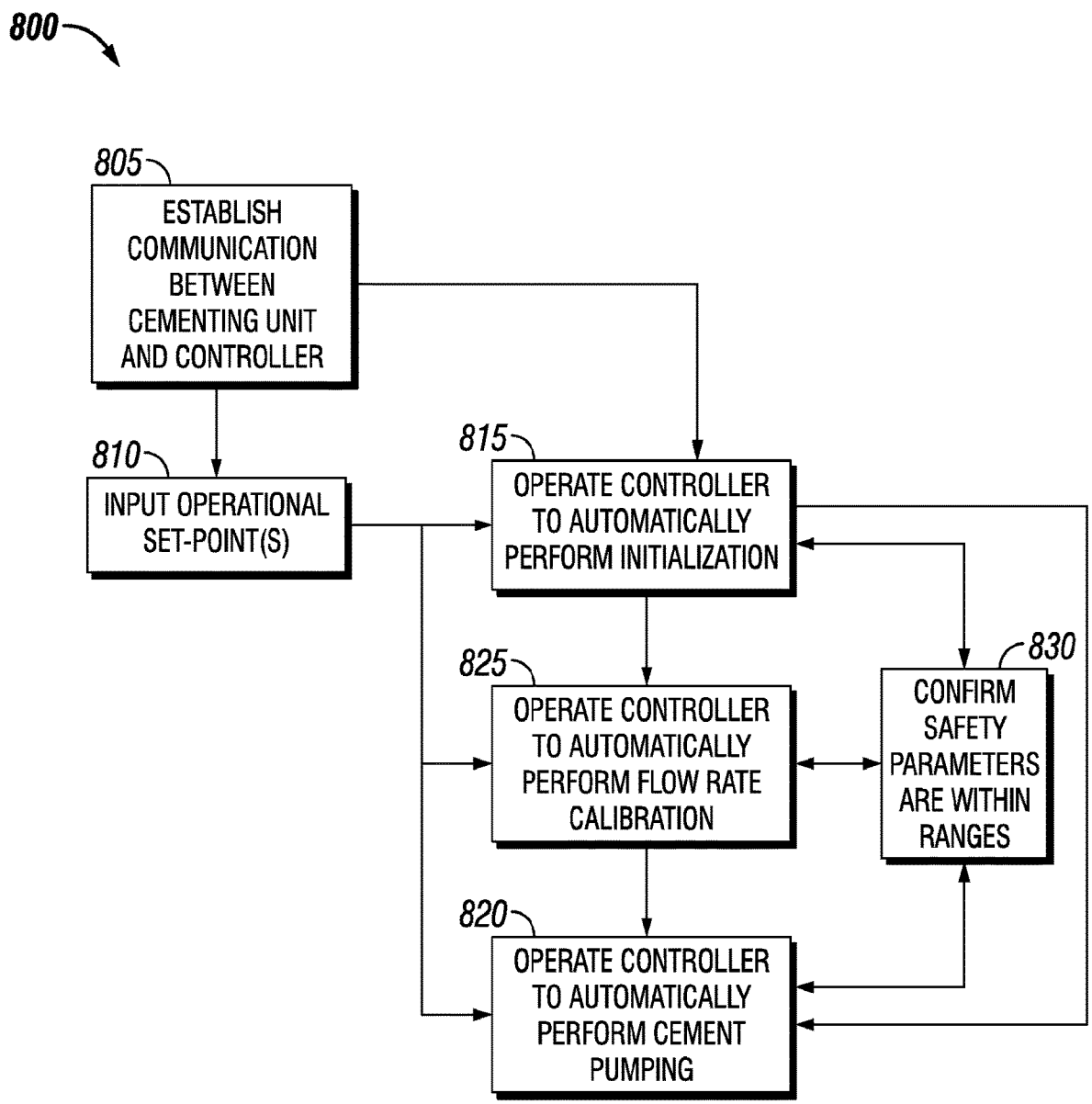
FIG. 9 is a flow-chart diagram of at least a portion of an example implementation of a method according to one or more aspects of the present disclosure.

FIG. 9 is a flow-chart diagram of at least a portion of an example implementation of another method (800) according to one or more aspects of the present disclosure. The method (800) may be performed utilizing or otherwise in conjunction with at least a portion of one or more implementations of one or more instances of the apparatus shown in one or more of FIGS. 1-5 and/or otherwise within the scope of the present disclosure. For example, the method (800) may be performed and/or caused, at least partially, by the controller 410 executing the coded instructions 432 according to one or more aspects of the present disclosure. Thus, the following description of the method (800) also refers to apparatus shown in one or more of FIGS. 1-5. However, the method (800) may also be performed in conjunction with implementations of apparatus other than those depicted in FIGS. 1-5 that are also within the scope of the present disclosure.

The method (800) may comprise establishing (805) communication between the cementing unit 200 and the controller 410. The method (800) may also comprise inputting (810) one or more set-points. For example, an input (810) set-point may be a fluid volume set-point and/or a flow rate set-point, as described above. The inputs (810) may be performed by a human operator via the input devices 426 described above, although the controller 410 may also be operable to retrieve the inputs as predetermined values/ranges included in the computer program code 432.

The method (800) also comprises operating the controller 410 to automatically initialize (815) the cementing unit 200 and perform (820) a cementing operation utilizing the cementing unit 200. Initializing (815) the cementing unit 200 may be via the method (500) shown in FIG. 6, or at least portions thereof. Performing (820) the cementing operation may be via the method (700) shown in FIG. 8, or at least portions thereof. The method (800) may also comprise operating the controller 410 to perform (825) a flow rate calibration of the cementing unit 200. The flow rate calibration (825) may be via the method (600) shown in FIG. 7, or at least portions thereof. The method (800) may also comprise confirming (830) that safety parameters are within predetermined ranges, similar to as described above. Other implementations of the method (800) shown in FIG. 9 also within the scope of the present disclosure may comprise other combinations of one or more aspects of two or more of the method (500) shown in FIG. 6, the method (600) shown in FIG. 7, and/or the method (700) shown in FIG. 8.

In view of the entirety of the present disclosure, including the claims and the figures, a person having ordinary skill in the art will readily recognize that the present disclosure introduces a method comprising: (A) establishing communication between a cementing unit and a controller operable to control operation of the cementing unit, wherein the controller comprises a processor and a memory including computer program code; (B) inputting a fluid volume set-point; and (C) operating the controller to automatically perform: (1) a flow rate calibration of the cementing unit, wherein the flow rate calibration comprises automatically: (a) varying pumping speed of the cementing unit while recording first pumping speeds and corresponding first flow rates generated by the cementing unit; and (b) determining a flow rate ramp relating the recorded first flow rates to the corresponding recorded first pumping speeds; and then (2) a cement pumping operation of the cementing unit, wherein the cement pumping operation comprises automatically: (a) increasing pumping speed of the cementing unit while recording: (i) second pumping speeds; (ii) first pressures generated by the cementing unit corresponding to the recorded second pumping speeds; and (iii) second flow rates generated by the cementing unit corresponding to the recorded second pumping speeds and/or first pressures; then (b) maintaining the pumping speed while recording the maintained pumping speed and corresponding second pressures and third flow rates; and then (c) decreasing the pumping speed while recording fourth pumping speeds and corresponding third pressures and fourth flow rates until the cementing unit has stopped pumping cement and a volume of the pumped cement is substantially equal to the fluid volume set-point.

The method may further comprise inputting an operational set-point, and varying the pumping speed may comprise: increasing pumping speed of the cementing unit while recording the first pumping speeds and the corresponding first flow rates generated by the cementing unit until the operational set-point is met; and decreasing pumping speed of the cementing unit while recording the first pumping speeds and the corresponding first flow rates generated by the cementing unit until the cementing unit stops pumping a fluid. The operational set-point may comprise a predetermined fluid volume to be pumped by the cementing unit. The method may further comprise inputting first and second incremental speed set-points, wherein the pumping speed may be increased during the flow rate calibration by the first incremental speed set-point until the operational set-point is met, and wherein the pumping speed may be decreased during the flow rate calibration by the second incremental speed set-point until the cementing unit stops pumping the fluid.

The method may further comprise inputting a fluid flow rate set-point, wherein: increasing pumping speed of the cementing unit may comprise increasing pumping speed of the cementing unit to reach the flow rate set-point; and maintaining the pumping speed may comprise maintaining the pumping speed to maintain the fluid flow rate set-point.

The cementing unit may comprise a plurality of sensors operable to generate information related to operational status of the cementing unit. In such implementations, among others within the scope of the present disclosure, operating the controller may further comprise operating the controller to automatically perform initialization of operation of the cementing unit prior to the flow rate calibration. The initialization may comprise automatically: determining operational parameters related to the cementing unit operational status based on the information generated by the sensors; and confirming the operational parameters are within corresponding predetermined ranges.

The present disclosure also introduces a method comprising: (A) establishing communication between a cementing unit and a controller operable to control operation of the cementing unit, wherein the cementing unit comprises a plurality of sensors operable to generate information related to operational status of the cementing unit, and wherein the controller comprises a processor and a memory including computer program code; (B) operating the controller to automatically perform initialization of the cementing unit, wherein the initialization comprises automatically: (1) determining operational parameters related to the cementing unit operational status based on the information generated by the sensors; and (2) confirming the operational parameters are within corresponding predetermined ranges.

The operational parameters may comprise at least one of cementing unit temperature, cementing unit pressure, presence of moisture in association with the cementing unit, cementing unit cooling system pressure, and cementing unit lubrication system pressure.

The method may further comprise inputting operational set-points to be utilized by the controller to automatically perform an operation of the cementing unit, wherein the initialization further comprises, after confirming the operational parameters are within the corresponding predetermined ranges, automatically performing a flow rate calibration utilizing the operational set-points. The operational set-points may relate to at least one of a fluid volume to be pumped by the cementing unit and a pumping speed of the cementing unit. The flow rate calibration may comprise: varying pumping speed of the cementing unit while recording the pumping speed and a corresponding flow rate generated by the cementing unit; and determining a flow rate ramp relating the recorded flow rates to the corresponding recorded pumping speeds. Varying the pumping speed may comprise: increasing the pumping speed of the cementing unit while recording the pumping speed and the corresponding flow rate generated by the cementing unit until a predetermined fluid volume is pumped by the cementing unit; and decreasing the pumping speed of the cementing unit while recording the pumping speed and the corresponding flow rate generated by the cementing unit until the cementing unit stops pumping the fluid. The pumping speed may be increased by a first incremental speed set-point until the predetermined fluid volume is pumped, and the pumping speed may be decreased by a second incremental speed set-point until the cementing unit stops pumping the fluid. The flow rate calibration may further comprise, before varying the pumping speed: confirming that the cementing unit is not pumping; confirming that the cementing unit is depressurized; confirming that a sufficient volume of fluid is available for performing the flow rate calibration; and either: (1) opening fluid inlet and outlet valves of the cementing unit; or (2) confirming that the fluid inlet and outlet valves of the cementing unit are open. The flow rate calibration may comprise each of: (1) opening the fluid inlet and outlet valves of the cementing unit; and (2) confirming that the fluid inlet and outlet valves of the cementing unit are open.

The method may further comprise operating the controller to automatically confirm that safety parameters are within corresponding predetermined ranges during the initialization.

The present disclosure also introduces a method comprising: (A) establishing communication between a cementing unit and a controller operable to control operation of the cementing unit, wherein the controller comprises a processor and a memory including computer program code; and (B) operating the controller to automatically perform a flow rate calibration of the cementing unit, wherein the flow rate calibration comprises automatically: (1) varying pumping speed of the cementing unit while recording the pumping speed and a corresponding flow rate generated by the cementing unit; and (2) determining a flow rate ramp relating the recorded flow rates to the corresponding recorded pumping speeds.

The method may further comprise inputting an operational set-point, and varying the pumping speed may comprise: increasing the pumping speed of the cementing unit while recording the pumping speed and the corresponding flow rate generated by the cementing unit until the operational set-point is met; and decreasing the pumping speed of the cementing unit while recording the pumping speed and the corresponding flow rate generated by the cementing unit until the cementing unit stops pumping a fluid. The operational set-point may comprise a predetermined fluid volume to be pumped by the cementing unit. The method may further comprise inputting first and second incremental speed set-points, wherein the pumping speed may be increased by the first incremental speed set-point until the operational set-point is met, and wherein the pumping speed may be decreased by the second incremental speed set-point until the cementing unit stops pumping the fluid. In such implementations, among others within the scope of the present disclosure, the recorded flow rates and corresponding recorded pumping speeds may be first recorded flow rates and first recorded pumping speeds; the flow rate ramp may be a first flow rate ramp; the method may further comprise inputting a first incremental percentage set-point, a second incremental percentage set-point, a fluid flow rate set-point, and a fluid volume set-point; and varying the pumping speed may further comprise, after estimating the first flow rate ramp: (a) increasing the pumping speed of the cementing unit by a speed corresponding to the first incremental percentage set-point of the fluid flow rate set-point based on the first flow rate ramp while recording second pumping speeds and corresponding second flow rates generated by the cementing unit until the fluid volume set-point is met; (b) decreasing the pumping speed of the cementing unit by a speed corresponding to the second incremental percentage set-point of the fluid flow rate set-point based on the first flow rate ramp while recording third pumping speeds and corresponding third flow rates generated by the cementing unit until the cementing unit stops pumping the fluid; and (c) determining a second flow rate ramp relating the second and third recorded flow rates to the corresponding second and third recorded pumping speeds.

The flow rate calibration may further comprise, before varying the pumping speed: (3) confirming that the cementing unit is not pumping; (4) confirming that the cementing unit is depressurized; (5) confirming that a sufficient volume of fluid is available for performing the flow rate calibration; and (6) either or both of: (i) opening fluid inlet and outlet valves of the cementing unit; or (ii) confirming that the fluid inlet and outlet valves of the cementing unit are open.

The method may further comprise operating the controller to automatically confirm that safety parameters are within corresponding predetermined ranges during the flow rate calibration.

The present disclosure also introduces a method comprising: (A) establishing communication between a cementing unit and a controller operable to control operation of the cementing unit, wherein the controller comprises a processor and a memory including computer program code; (B) inputting a fluid volume set-point; and (C) operating the controller to automatically perform a cement pumping operation of the cementing unit, wherein the cement pumping operation comprises automatically: (1) increasing pumping speed of the cementing unit while recording the pumping speed, pressure generated by the cementing unit and corresponding to the pumping speed, and cement flow rate generated by the cementing unit and corresponding to the pumping speed and/or pressure; then (2) maintaining the pumping speed while recording the pumping speed and the corresponding pressure and cement flow rate; and then (3) decreasing the pumping speed while recording the pumping speed and the corresponding pressure and cement flow rate until the cementing unit has stopped pumping cement and a volume of the pumped cement is substantially equal to the fluid volume set-point.

The method may further comprise inputting a fluid flow rate set-point, and the cement pumping operation may further comprise: increasing pumping speed of the cementing unit to reach the flow rate set-point; and maintaining the pumping speed to maintain the fluid flow rate set-point.

The cementing unit may further comprise a plurality of sensors operable to generate information related to operational status of the cementing unit, and the method may further comprise: determining operational parameters related to the cementing unit operational status based on the information generated by the sensors; and confirming that the operational parameters are within corresponding predetermined ranges.

The cement pumping operation may further comprise performing a flow rate calibration of the cementing unit before increasing, maintaining, and decreasing the pumping speed, wherein the flow rate calibration comprises automatically: varying pumping speed of the cementing unit while recording the pumping speed and a corresponding flow rate generated by the cementing unit; and determining a flow rate ramp relating the recorded flow rates to the corresponding recorded pumping speeds. The flow rate calibration may further comprise, before varying the pumping speed: confirming that the cementing unit is not pumping; confirming that the cementing unit is depressurized; confirming that a sufficient volume of fluid is available for performing the flow rate calibration; and either or both of: opening fluid inlet and outlet valves of the cementing unit; or confirming that the fluid inlet and outlet valves of the cementing unit are open.

The method may further comprise operating the controller to automatically confirm that safety parameters are within corresponding predetermined ranges during the cement pumping operation.

The present disclosure also introduces apparatus operable to perform: the methods described above; one or more of such methods; one or more aspects of such methods; and/or other methods within the scope of the present disclosure.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method comprising:
 establishing communication between a cementing unit and a controller operable to control operation of the cementing unit, wherein the controller comprises a processor and a memory including computer program code; and
 operating the controller to automatically perform a flow rate calibration of the cementing unit, wherein the flow rate calibration comprises automatically:
  varying pumping speed of the cementing unit while recording the pumping speed and a corresponding flow rate generated by the cementing unit, wherein varying the pumping speed of the cementing unit comprises increasing the pumping speed of the cementing unit based on a first incremental percentage set-point until a volume of cement pumped by the cementing unit is substantially equal to a fluid volume set-point, and decreasing the pumping speed of the cementing unit based on a second incremental percentage set-point until the cementing unit stops pumping the cement; and
  determining a flow rate ramp relating the recorded flow rates to the corresponding recorded pumping speeds.

2. The method of claim 1 further comprising inputting the fluid volume set-point, and wherein varying the pumping speed comprises:
 increasing the pumping speed of the cementing unit while recording the pumping speed and the corresponding flow rate generated by the cementing unit until the fluid volume set-point is met; and
 decreasing the pumping speed of the cementing unit while recording the pumping speed and the corresponding flow rate generated by the cementing unit until the cementing unit stops pumping the cement.

3. The method of claim 2 further comprising inputting first and second incremental speed set-points, wherein the pumping speed is increased by the first incremental speed set-point until the fluid volume set-point is met, and wherein the pumping speed is decreased by the second incremental speed set-point until the cementing unit stops pumping the cement.

4. The method of claim 3 wherein:
 the recorded flow rates and corresponding recorded pumping speeds are first recorded flow rates and first recorded pumping speeds;
 the flow rate ramp is a first flow rate ramp;
 the method further comprises inputting the first incremental percentage set-point, the second incremental percentage set-point, a fluid flow rate set-point, and the fluid volume set-point; and
 varying the pumping speed further comprises, after estimating the first flow rate ramp:
  increasing the pumping speed of the cementing unit by a speed corresponding to the first incremental percentage set-point of the fluid flow rate set-point based on the first flow rate ramp while recording second pumping speeds and corresponding second flow rates generated by the cementing unit until the fluid volume set-point is met;
  decreasing the pumping speed of the cementing unit by a speed corresponding to the second incremental percentage set-point of the fluid flow rate set-point based on the first flow rate ramp while recording third pumping speeds and corresponding third flow rates generated by the cementing unit until the cementing unit stops pumping the cement; and
  determining a second flow rate ramp relating the second and third recorded flow rates to the corresponding second and third recorded pumping speeds.

5. The method of claim 1 wherein the flow rate calibration further comprises, before varying the pumping speed:
 confirming that the cementing unit is not pumping;
 confirming that the cementing unit is depressurized;
 confirming that a sufficient volume of fluid is available for performing the flow rate calibration; and
 either:
  opening fluid inlet and outlet valves of the cementing unit; or
  confirming that the fluid inlet and outlet valves of the cementing unit are open.

6. The method of claim 1 further comprising operating the controller to automatically confirm that safety parameters are within corresponding predetermined ranges during the flow rate calibration.

* * * * *